United States Patent
Maamari et al.

(10) Patent No.: US 10,651,900 B2
(45) Date of Patent: May 12, 2020

(54) SYSTEM AND METHOD FOR COMMUNICATIONS SYSTEM TRAINING

(71) Applicant: FutureWei Technologies, Inc., Plano, TX (US)

(72) Inventors: Diana Maamari, Palatine, IL (US); Jialing Liu, Palatine, IL (US); Qian Cheng, Naperville, IL (US); Weimin Xiao, Hoffman Estates, IL (US); Hao Zhou, Evanston, IL (US); Anthony C. K. Soong, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 0 days.

(21) Appl. No.: 15/983,692

(22) Filed: May 18, 2018

(65) Prior Publication Data

US 2019/0356364 A1 Nov. 21, 2019

(51) Int. Cl.

| | |
|---|---|
| *H04B 7/02* | (2018.01) |
| *H04B 7/0417* | (2017.01) |
| *H04L 5/00* | (2006.01) |
| *H04W 72/08* | (2009.01) |
| *H04B 7/06* | (2006.01) |
| *H04W 72/04* | (2009.01) |

(52) U.S. Cl.
CPC ......... *H04B 7/0417* (2013.01); *H04B 7/0626* (2013.01); *H04L 5/0051* (2013.01); *H04W 72/042* (2013.01); *H04W 72/082* (2013.01)

(58) Field of Classification Search
CPC ... H04B 7/0417; H04B 7/0626; H04L 5/0051; H04W 72/042; H04W 72/082

USPC .......................................................... 375/267
See application file for complete search history.

(56) References Cited

U.S. PATENT DOCUMENTS

| | | | |
|---|---|---|---|
| 9,326,177 B2 | 4/2016 | Liu et al. | |
| 2014/0086176 A1* | 3/2014 | Liu ..................... | H04W 74/006 370/329 |
| 2015/0270882 A1* | 9/2015 | Shattil .................. | H04B 1/0003 370/329 |
| 2016/0127018 A1* | 5/2016 | Nammi ................ | H04B 7/0417 375/267 |
| 2017/0063503 A1 | 3/2017 | Liu et al. | |
| 2018/0091197 A1 | 3/2018 | Huang et al. | |

(Continued)

FOREIGN PATENT DOCUMENTS

| | | |
|---|---|---|
| WO | 2016029434 A1 | 3/2016 |
| WO | 2016114696 A1 | 7/2016 |
| WO | 2016131487 A1 | 8/2016 |

OTHER PUBLICATIONS

"3rd Generation Partnership Project; Technical Specification Group Radio Access Network; NR; Physical channels and modulation (Release 15)," 3GPP TS 38.211 V15.1.0, Mar. 2018, 87 pages.

(Continued)

*Primary Examiner* — Helene E Tayong
(74) *Attorney, Agent, or Firm* — Slater Matsil, LLP

(57) ABSTRACT

A method for operating a communication device includes receiving a first transmission including a first signal on one or more resources associated with signal reception, deriving a receive filter in accordance with the received first transmission, deriving a transmit filter in accordance with the receive filter, precoding a second signal with the transmit filter, thereby producing a second transmission, and transmitting the second transmission.

40 Claims, 8 Drawing Sheets

(56) References Cited

U.S. PATENT DOCUMENTS

2018/0192400 A1* 7/2018 Wei .................. H04W 28/04
2019/0090220 A1* 3/2019 Li .................. H04W 76/14

OTHER PUBLICATIONS

3rd Generation Partnership Project; Technical Specification Group Radio Access Network; NR; Physical layer procedures for data (Release 15), 3GPP TS 38.214 V15.1.0, Mar. 2018, 77 pages.
Brandt, et al., "Distributed CSI Acquisition and Coordinated Precoding for TDD Multicell MIMO Systems," IEEE Transactions on Vehicular Technology, vol. 65, No. 5, May 2016, pp. 2890-2906.
Candes, et al., "Enhancing Sparsity by Reweighted L1 Minimization," Journal of Fourier Analysis and Applications, vol. 14, Issue 5-6, pp. 877-905.
Hoydis, et al., "Massive MIMO in the UL/DL of Cellular Networks: How Many Antennas Do We Need?," IEEE Journal on Selected Areas in Comunications, vol. 31, No. 2, Feb. 2013, pp. 160-171.
Jungnickel, et al., "The Role of Small Cells, Coordinated Multipoint, and Massive MIMO in 5G," IEEE Communications Magazine, vol. 52, Issue 5, May 2014, pp. 44-51.
Kaleva et al., "Decentralized Sum Rate Maximization With Qos Constraints for Interfering Broadcast Channel Via Successive Convex Approximation," IEEE Transactions on Signal Processing, vol. 64, No. 11, Jun. 1, 2016, pp. 2788-2802.
Kaleva, et al., "Decentralized Joint Precoding With Pilot-Aided Beamformer Estimation," IEEE Transactions on Signal Processing, vol. 66, No. 9, May 2015, pp. 2330-2341.
Larsson, et al., "Massive MIMO for Next Generation Wireless Systems," IEEE Communications Magazine, Feb. 2014, pp. 186-195.
Marzetta, Thomas, "Noncooperative Cellular Wireless with Unlimited Numbers of Base Station Antennas," IEEE Transactions on Wireless Communications, vol. 9, No. 11, Nov. 2010, pp. 3590-3600.
Shen et al., "Fractional Programming for Communication Systems—Part I: Power Control and Beamforming," IEEE Transactions on Signal Processing, vol. 66, No. 10, May 15, 2018, pp. 2616-2630.
Shi, et al., "An Iteratively Weighted MMSE Approach to Distributed Sum-Utility Maximization for a MIMO Interfering Broadcase Channel," IEEE Transactions on Signal Processing, vol. 59, No. 9, Sep. 2011, pp. 4331-4340.
Shi et al., "Bi-Directional Training for Adaptive Beamforming and Power Control in Interference Networks," IEEE Transactions on Signal Processing, vol. 62, No. 3, Feb. 1, 2014, pp. 607-618.
Xu, et al., "Distributed Bi-Directional Training of Nonlinear Precoders and Receivers in Cellular Networks," IEEE Transactions on Signal Processing, vol. 63, No. 21, Nov. 1, 2015, pp. 5597-5608.
Zhou, et al., "Sparse Channel Estimation for Massive MIMO with 1-bit Feedback per Dimension," IEEE Wireless Communications and Networking Conference (WCNC), San Francisco, CA, Mar. 19-22, 2017, 6 pages.
Zhuang, et al., "Energy-Efficient Cell Activation, User Association, and Spectrum Allocation in Heterogeneous Networks," IEEE Journal on Selected Areas in Communications, vol. 34, No. 4, Apr. 2016, pp. 823-831.

* cited by examiner

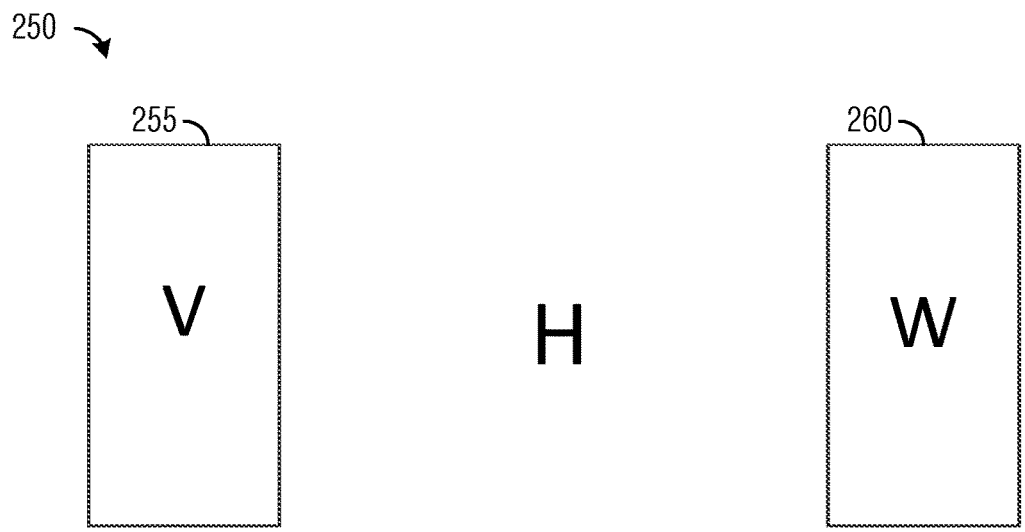
Fig. 2B
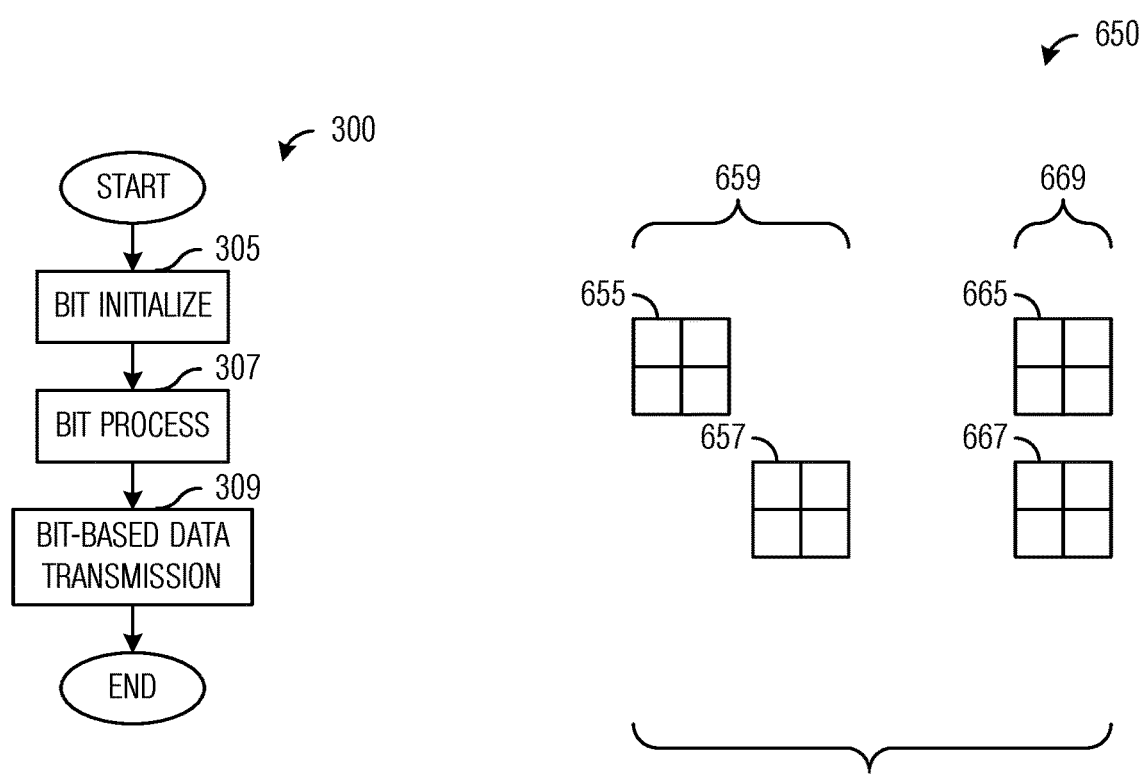
Fig. 3
Fig. 6B

DOWNLINK NZP-CSI RS FOR CHANNEL MEASUREMENT

DOWNLINK ZP-CSI RS FOR INTERFERENCE MEASUREMENT

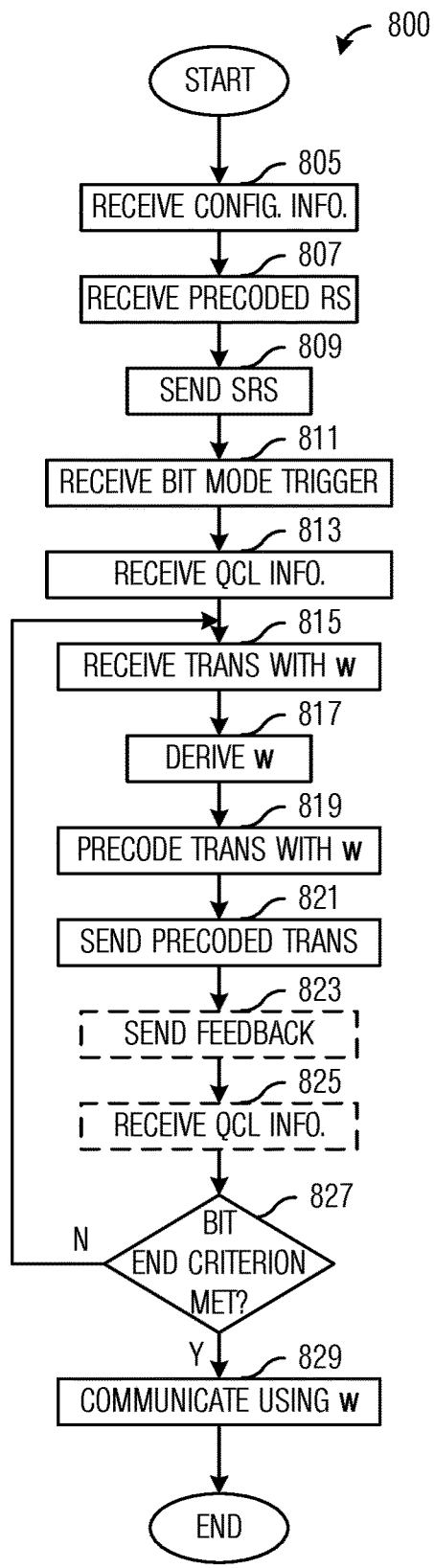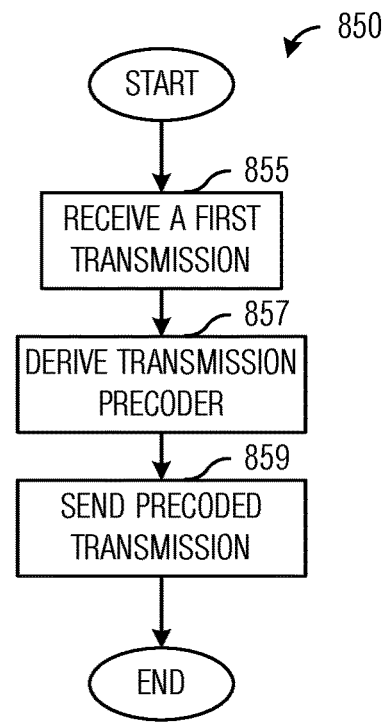
Fig. 8A
Fig. 8B

SYSTEM AND METHOD FOR COMMUNICATIONS SYSTEM TRAINING

TECHNICAL FIELD

The present disclosure relates generally to a system and method for digital communications, and, in particular embodiments, to a system and method for communications system training.

BACKGROUND

Antenna element to element channel estimation in a communication system with large numbers of antennas is prohibitive in terms of computational resources and communications overhead, such as in a massive multiple input multiple output (MIMO) communication system with tens or hundreds or more antennas. The amount of computation and communications required to support antenna element to element channel estimation is compounded in deployments that are highly dynamic in nature, when the channel estimation has to be performed with high frequency to meet the constantly changing environment and to accommodate dynamic traffic changes.

Therefore, there is a need for systems and methods that support communications system training that do not require excessive amounts of computational resources and communications overhead and still can achieve a same level of, or even improved, performance, such as throughput performance, for example.

SUMMARY

Example embodiments provide a system and method for communications system training.

In accordance with an example embodiment, a computer implemented method for operating a communications device is provided. The method includes receiving, by the communications device from one or more access nodes, a first transmission including a first signal on one or more resources associated with signal reception, deriving, by the communications device, a receive filter in accordance with the received first transmission, deriving, by the communications device, a transmit filter in accordance with the receive filter, precoding, by the communications device, a second signal with the transmit filter, thereby producing a second transmission, and transmitting, by the communications device to the one or more access nodes, the second transmission.

Optionally, in any of the preceding embodiments, an embodiment wherein the first transmission comprises the first signal transmitted on one or more first transmission ports, and wherein each first transmission port corresponds to a transmission layer, and a first number of transmission layers of the first transmission corresponds to a first transmission rankfirst transmission rank.

Optionally, in any of the preceding embodiments, an embodiment wherein the first transmission comprises the first signal transmitted on one or more first transmission ports, with each first transmission port corresponds to a transmission layer, and wherein the transmit filter is a weighted version of the receive filter weighted by weights associated with each of the transmission layers.

Optionally, in any of the preceding embodiments, an embodiment wherein the second transmission is transmitted on one or more second transmission ports, and wherein the first number of transmission layers of the first transmission and a second number of transmission layers of the second transmission are the same.

Optionally, in any of the preceding embodiments, an embodiment wherein the one or more first transmission ports of the first transmission and one or more second transmission ports of the second transmission have a one-to-one mapping.

Optionally, in any of the preceding embodiments, an embodiment wherein the resources associated with signal reception comprise at least one of non-zero-power (NZP) channel state information reference signal (CSI-RS) resources configured for channel and interference measurement, NZP CSI-RS resources configured for channel measurement, demodulation reference signal (DMRS) resources, or physical downlink shared channel (PDSCH) resources.

Optionally, in any of the preceding embodiments, an embodiment wherein the communications device further receives interference on resources associated with interference transmission, and wherein deriving the receive filter further comprising deriving, by the communications device, the receive filter in accordance with the received first transmission and the received interference.

Optionally, in any of the preceding embodiments, an embodiment wherein the resources associated with interference transmission comprise at least one of NZP CSI-RS resources configured for channel and interference measurement, NZP CSI-RS resources configured for channel measurement, NZP CSI-RS resources configured for interference measurement, zero-power (ZP) CSI-RS resources configured for interference measurement, CSI interference measurement resources, DMRS resources, or PDSCH resources.

Optionally, in any of the preceding embodiments, an embodiment wherein the communications device derives the receive filter in accordance with the received first transmission and the received interference on resources associated with signal reception and interference transmission that are partially overlapped or completely overlapped.

Optionally, in any of the preceding embodiments, an embodiment further comprising sending, by the communications device to the one or more access nodes, feedback information based on the received first transmission and the received interference.

Optionally, in any of the preceding embodiments, an embodiment further comprising repeating, by the communications device, the receiving, the deriving the receive filter, the deriving the transmit filter, the precoding, and the transmitting until an end criterion is met.

Optionally, in any of the preceding embodiments, an embodiment wherein the end criterion comprises at least one of a signal plus interference to noise ratio (SINR) meeting a threshold, or the communications device receiving an instruction to stop training.

Optionally, in any of the preceding embodiments, an embodiment wherein the second transmission is one of a sounding reference signal (SRS) transmission or a DMRS transmission.

Optionally, in any of the preceding embodiments, an embodiment wherein the transmit filter and the receive filter are equivalent.

Optionally, in any of the preceding embodiments, an embodiment wherein the transmit filter and the receive filter are at least one of conjugate transposed versions of each other, conjugated versions of each other, scaled versions of each other, normalized versions of each other, or are identical to each other.

Optionally, in any of the preceding embodiments, an embodiment wherein the receive filter is derived in accordance with a minimum mean square error (MMSE) combiner.

Optionally, in any of the preceding embodiments, an embodiment further comprising sending, by the communications device to the one or more access nodes prior to receiving the first transmission, a precoded SRS or a non-precoded SRS.

Optionally, in any of the preceding embodiments, an embodiment wherein the communications device transmits the SRS with the same filter used for a reception of a periodic CSI-RS or a semi-persistent CSI-RS, and for a reception of interference.

Optionally, in any of the preceding embodiments, an embodiment wherein the first and second transmissions occur over one or more subbands, and wherein the receive filter and the transmit filter are separately derived for each subband.

Optionally, in any of the preceding embodiments, an embodiment wherein the transmit filter comprises a multi-antenna precoder, and wherein the receive filter comprises a multi-antenna combiner.

In accordance with an example embodiment, computer implemented method for operating an access node in a training mode is provided. The method includes precoding, by the access node, a first signal with a transmit filter, thereby producing a first transmission, transmitting, by the access node to a communications device, the first transmission, receiving, by the access node from the communications device, a second transmission including second signal on resources associated with signal reception, deriving, by the access node, a receive filter in accordance with the received second transmission, and deriving, by the access node, the transmit filter in accordance with the receive filter.

Optionally, in any of the preceding embodiments, an embodiment further comprising repeating, by the access node, the precoding, the transmitting, the receiving, the deriving the receive filter, and the deriving the transmit filter until an end criterion is met.

Optionally, in any of the preceding embodiments, an embodiment wherein the end criterion comprises a SINR meeting a threshold.

Optionally, in any of the preceding embodiments, an embodiment further comprising receiving, by the access node from the communications device, feedback information, and wherein deriving the receive filter is in accordance with the feedback information.

Optionally, in any of the preceding embodiments, an embodiment wherein the first transmission is transmitted over a plurality of transmission layers, and wherein the method further comprises reducing, by the access node, a first transmission rankfirst transmission rank when a SINR of at least one transmission layer is below a threshold, and signaling, by the access node to the communications device, the reduced first transmission rankfirst transmission rank.

Optionally, in any of the preceding embodiments, an embodiment further comprising sending, by the access node to the communications device, an instruction to stop operating in the training mode.

Optionally, in any of the preceding embodiments, an embodiment wherein deriving the receive filter comprises adjusting the receive filter to maximize a SINR of a communications system including the communications device and the access node.

Optionally, in any of the preceding embodiments, an embodiment further comprising receiving, by the access node from the communications device prior to precoding the first signal, a SRS or a non-precoded SRS.

Optionally, in any of the preceding embodiments, an embodiment wherein the transmit filter is selected in accordance with the SRS or the non-precoded SRS.

Optionally, in any of the preceding embodiments, an embodiment further comprising, prior to precoding the first signal, sending, by the access node to the communications device, a trigger initiating operating in the training mode.

Optionally, in any of the preceding embodiments, an embodiment wherein the first transmission is transmitted on one or more first transmission ports, wherein the second transmission comprises the second signal transmitted on one or more second transmission ports, and wherein the one or more first transmission ports of the first transmission and the one or more second transmission ports of the second transmission have a one-to-one mapping.

In accordance with an example embodiment, a communications device is provided. The communications device includes a memory storage comprising instructions, and one or more processors in communication with the memory storage. The one or more processors execute the instructions to receive, from one or more access nodes, a first transmission including a first signal on one or more resources associated with signal reception, derive a receive filter in accordance with the received first transmission, derive a transmit filter in accordance with the receive filter, precode a second signal with the transmit filter, thereby producing a second transmission, and transmit, to the one or more access nodes, the second transmission.

Optionally, in any of the preceding embodiments, an embodiment wherein interference is received on resources associated with interference transmission, and wherein the one or more processors further execute the instructions to derive the receive filter in accordance with the received first transmission and the received interference.

Optionally, in any of the preceding embodiments, an embodiment wherein the one or more processors further execute the instructions to send, to the one or more access nodes, feedback information based on the received first transmission and the received interference.

Optionally, in any of the preceding embodiments, an embodiment wherein the one or more processors further execute the instructions to repeat receiving the first transmission, deriving the receive filter, deriving the transmit filter, precoding the second signal, and transmitting the second transmission until an end criterion is met.

Optionally, in any of the preceding embodiments, an embodiment wherein the one or more processors further execute the instructions to send, to the one or more access nodes prior to receiving the first transmission, a precoded SRS or a non-precoded SRS.

In accordance with an example embodiment, an access node is provided. The access node includes a memory storage comprising instructions, and one or more processors in communication with the memory storage. The one or more processors execute the instructions to precode a first signal with a transmit filter, thereby producing a first transmission, transmit, to a communications device, the first transmission, receive, from the communications device, a second transmission including second signal on resources associated with signal reception, derive a receive filter in accordance with the received second transmission, and derive the transmit filter in accordance with the receive filter.

Optionally, in any of the preceding embodiments, an embodiment wherein the one or more processors further execute the instructions to repeat precoding the first signal, transmitting the first transmission, receiving the second transmission, deriving the receive filter, and deriving the transmit filter until an end criterion is met.

Optionally, in any of the preceding embodiments, an embodiment wherein the one or more processors further execute the instructions to receive, from the communications device, feedback information, and wherein the receive filter is derived in accordance with the feedback information.

Optionally, in any of the preceding embodiments, an embodiment wherein the first transmission is transmitted over a plurality of transmission layers, and wherein the one or more processors further execute the instructions to reduce a first transmission rank when a SINR of at least one transmission layer is below a threshold, and signal, to the communications device, the reduced first transmission rank.

Optionally, in any of the preceding embodiments, an embodiment wherein the one or more processors further execute the instructions to send, to the communications device, an instruction to stop operating in a training mode.

Optionally, in any of the preceding embodiments, an embodiment wherein the one or more processors further execute the instructions to receive, from the communications device prior to precoding the first signal, a SRS or a non-precoded SRS.

Optionally, in any of the preceding embodiments, an embodiment wherein the one or more processors further execute the instructions to send, to the communications device prior to precoding the first signal, a trigger initiating operating in a training mode.

Practice of the foregoing embodiments enables a distributed low complexity training procedure that scales well in communications systems with large numbers of antennas. The low complexity allows the training to occur with high frequency to more accurately capture the nature of dynamic operating environments.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 2B illustrates an example communications system, highlighting w and v;

FIG. 3 is a flow diagram of example operations occurring in a bi-directional training (BIT) process;

FIG. 6B illustrates an example relationship between CMRs and resource elements of OFDM symbols or PRBs according to example embodiments described herein;

FIG. 8A illustrates a flow diagram of example operations occurring in a UE performing BIT-based communications according to example embodiments described herein;

FIG. 8B illustrates a flow diagram of example operations occurring in a UE supporting BIT training according to example embodiments described herein;

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
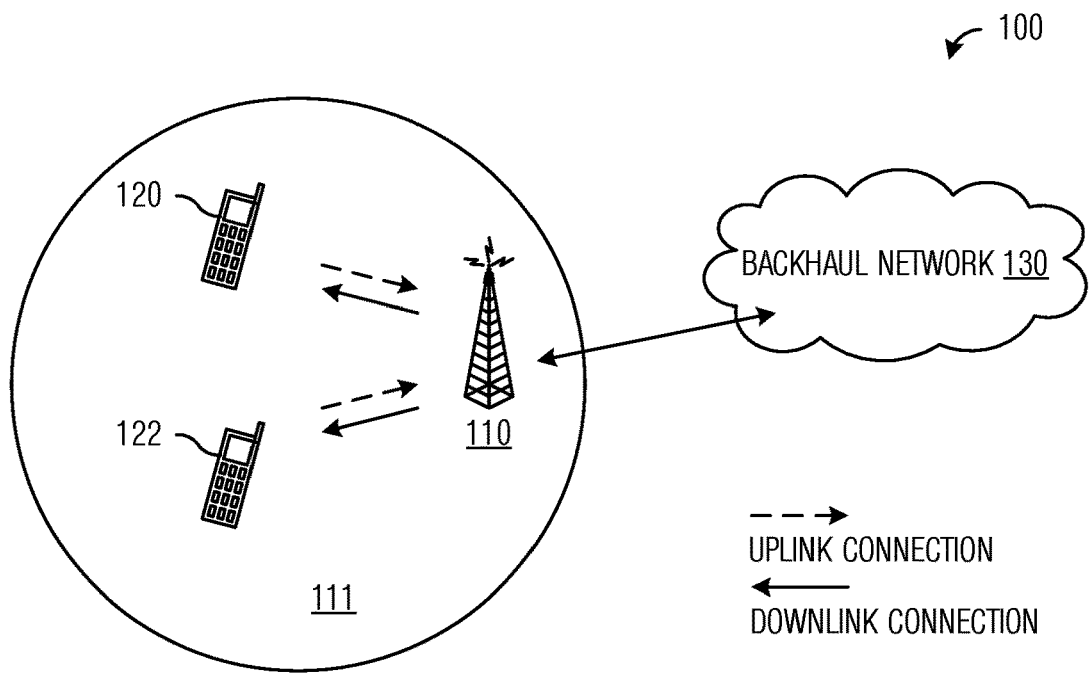
FIG. 1 illustrates an example wireless communications system according to example embodiments described herein.

FIG. 1 illustrates an example wireless communication system loft Communication system 100 includes an access node 110 with coverage area 111. Access node 110 serves a plurality of user equipments (UEs), including UE 120 and UE 122. Transmissions from access node no to a UE is referred to as a downlink (DL) transmission and occurs over a downlink channel (shown in FIG. 1 as a solid arrowed line), while transmissions from a UE to access node no is referred to as an uplink (UL) transmission and occurs over an uplink channel (shown in FIG. 1 as a dashed line). Services may be provided to the plurality of UEs by service providers connected to access node no through a backhaul network 130, such as the Internet. The wireless communication system 100 may include multiple distributed access nodes 110.

In a typical communications system, there are several operating modes. In a cellular operating mode, communications to and from the plurality of UEs go through access node 110, while in device to device communications mode, such as proximity services (ProSe) operating mode, for example, direct communication between UEs is possible. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, relays, customer premises equipment (CPE), and so on. UEs may also be commonly referred to as mobile stations, mobiles, terminals, users, subscribers, stations, communication devices, CPEs, relays, Integrated Access and Backhaul (JAB) relays, and the like. It is noted that when relaying is used (based on relays, picos, CPEs, and so on), especially multihop relaying, the boundary between a controller and node controlled by the controller may become blurry, and a dual node (either the controller or the node controlled by the controller) deployment where a first node that provides configuration or control information to a second node is considered to be the controller. Likewise, the concept of UL and DL transmissions can be extended as well.

A cell may include one or more bandwidth pails (BWPs) for UL or DL allocated for a UE. Each BWP may have its own BWP-specific numerology and configuration. It is noted that not all BWPs need to be active at the same time for the UE. A cell may correspond to one or more carriers. Typically, one cell (a primary cell (PCell) or a secondary cell (SCell), for example) is a component carrier (a primary component carrier (PCC) or a secondary CC (SCC), for example). For some cells, each cell may include multiple carriers in UL, one carrier is referred to as an UL carrier or non-supplementary UL (non-SUL) UL carrier which has an associated DL, and other carriers are called a supplementary UL (SUL) carriers which do not have an associated DL. A cell, or a carrier, may be configured with slot or subframe formats comprised of DL and UL symbols, and that cell or carrier is seen as operating in time division duplexed (TDD) mode. In general, for unpaired spectrum, the cells or carriers are in TDD mode, and for paired spectrum, the cells or carrier are in a frequency division duplexed (FDD) mode. Access nodes may provide wireless access in accordance with one or more wireless communication protocols, e.g., long term evolution (LTE), LTE advanced (LTE-A), 5G, 5G LTE, 5G NR, High Speed Packet Access (HSPA), Wi-Fi 802.11a/b/g/n/ac, etc. While it is understood that communications systems may employ multiple access nodes capable of communicating with a number of UEs, only one access node, and two UEs are illustrated for simplicity.

In standard antenna element to element channel estimation, a channel between two devices is estimated by having a first device transmit a known signal on a known time or frequency resource (s) to a second device, the received signal at the second device is expressible as:

$$y=Hx+n \quad (1)$$

where y is the received signal at the second device, x is the known signal (which may be a reference signal, a pilot, or a pilot signal), H is the channel model or response, and n is the noise (and interference for some communication channels). Because x is known by the second device, it is possible for the second device to determine or estimate H from y.

However, in a communications system with a large number of antennas, such as a massive multiple input multiple output (MIMO) communications system, H generally has to be estimated for every possible transmit-receive antenna pair. Therefore, antenna element to element channel estimation may be expensive in terms of computational resources, as well as communications overhead. It is noted that the concept of antenna, antenna element, and antenna port may be generally interchangeable, but in some specific scenarios, they can mean different but related subjects. For example, one transmit (Tx) antenna port may be formed (or virtualized) by multiple antenna elements or antennas, and the receiver sees only the one Tx antenna port but not each of the multiple antenna elements or antennas. The virtualization may be achieved via beamforming, for example.

Channel state information (CSI) is, in general, required to design the beamforming algorithms. Bi-directional training (BIT), also known as forward-backward training, is a generally distributed training procedure with low computational complexity that is used to train and update transmit precoders and receive combiners without explicitly estimating the CSI. BIT may adapt transmit beamformers, which may also be commonly known as transmit precoders, transmission filters, spatial transmission filters, transmit filter, analog precoder, and the like and receiver combiners (which are also commonly known as receive filter, spatial receive filters, analog combiner, and the like) in TDD MIMO communications systems. In BIT, neither device (a transmitting device or a receiving device) participating in BIT may have a priori knowledge of CSI, especially detailed information about the channel such as channel matrix H or covariance matrix of the channel, wherein the channel may be one between a UE and its serving access node(s) or one between a UE and its interfering access node(s) (which generally requires information exchanges among access nodes, such as channel information about an interfering link or RS information so that the UE or access node can estimate the interfering link). BIT consists of forward training (e.g., in a downlink direction) and backward training (e.g., in an uplink direction) that is repeated until convergence is achieved. BIT is capable of adapting to unknown interference and can suppress interference without any channel estimation or CSI feedback, thereby making BIT less sensitive to the orthogonality of training sequences.

In another embodiment, the devices participating in BIT may have a priori knowledge of precoders and combiners, such as, for example, some knowledge of precoders and combiners obtained from having had performed coarse beamforming which may be followed by a stage of beam refinement, the coarse beamforming is performed prior to BIT and the devices may use BIT as a refinement of the precoders and combiners.

A benefit of massive MIMO is the ability of multiplexing multiple spatial independent data streams simultaneously. Large antenna arrays provide much greater degrees of freedom (DoF), and advanced interference management techniques can be applied to reduce mutual interference. This also brings the challenge of allocating those spatial resources among the scheduled users. With a centralized controller, the rank allocation problem can be solved by collecting global CSI and optimized in a centralized way. However, for distributed algorithms, such as BIT, this problem is even more challenging because the CSI is not available.

Figure 2A:
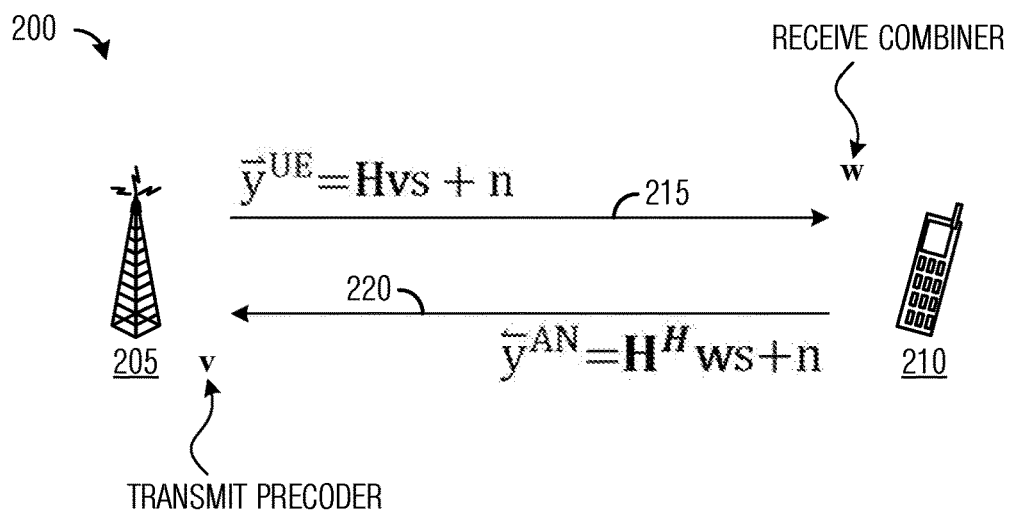
FIG. 2A illustrates an example communications system, providing mathematical expressions of signals transmitted in the communications system.

FIG. 2A illustrates an example communications system 200, providing mathematical expressions of signals transmitted in the communications system. Communications system 200 includes an access node 205 communicating with UE 210. As shown in FIG. 2, access node 205 is using a transmit filter v and UE 210 is using a receive filter w. Both access node 205 and UE 210 use linear precoding or combining. Assuming H is $N_{rx} \times N_{tx}$ matrix of a MIMO system, i.e., there are $N_{tx}$ transmit antennas and $N_{rx}$ receive antennas. The transmit filter v of dimension $N_{tx} \times Ns$ enables the transmitter to precode or beamform the transmitted signal, where Ns is the number of layers, streams, symbols, pilots, messages, or known sequences transmitted. The precoder (i.e., the transmit filter v) can be a digital precoder, analog precoder, or hybrid digital-analog precoder, in which case Ns is replaced by $N_{RF}$ representing the number of RF chains and is either equal to or smaller than the number of transmit antennas or transmit antenna ports. The receive filter w of multi-antenna systems is of dimension $N_{rx} \times Ns$ and represents the combining matrix. The combiner (i.e., the receive filter w) can be a digital combiner, an analog combiner, or a hybrid digital-analog combiner. In the analog or hybrid case, the analog beams are chosen in accordance with the received signal and interference. It is noted that the above description is for a transmission from access node 205 to UE 210, i.e., a downlink transmission. The transmission may also occur at the reverse direction (an uplink transmission), for which the channel matrix becomes $H^H$, which is the Hermitian of channel model H, and w may be seen as the transmit filter and v as the receiver filter. The w for transmission and the w for reception may or may not be the same, and likewise for v.

A downlink (or forward) channel 215 between access node 205 and UE 210 has channel model or response H, while an uplink (or backward, or reverse) channel 220 between UE 210 and access node 205 has channel model or response $H^H$, which is the Hermitian of channel model H. Although FIG. 2A depicts only one access node and one UE, it is not limited to this case. Multiple UEs may be served by the access node, on different time-frequency resources (such as FDM-TDM, as in typical cellular systems) or on the same time-frequency resources (such as MU-MIMO, wherein multiple UEs are paired together and each UE is individually precoded). Among the paired UEs, there is intra-cell interference. Also multiple access nodes may exist in the network, some of which may be cooperatively serving UE 210 in a joint transmission fashion (such as coherent joint transmission, non-coherent joint transmission, etc.), dynamic point switching fashion, and so on. Some other access nodes may not serve UE 210 and their transmissions to their UEs cause inter-cell interference to UE 210. The scenario of multiple access nodes and multiple UEs, with access node cooperation to serve a UE and with MU-MIMO, is a scenario considered herein, and the example embodiments of bi-directional training applies to this scenario.

FIG. 2B illustrates an example communications system 250, highlighting w and v. Communications system 250 includes a first device 255 and a second device 260. First device 255 and second device 260 are communicating. First device 255 may be an access node (or a UE), while second device may be a UE (or an access node). Transmissions from first device 255 may be precoded using transmit filter v and receptions at first device 255 may be precoded using receive filter v. Similarly, transmissions from second device 260 may be precoded using transmit filter w and receptions at second device 260 may be precoded using receive filter w. The channels between first device 255 and second device 260 may be modeled as a transfer function H (or $H^H$).

Referring back now to FIG. 2A, forward training includes access node 205 precoding a downlink signal s with transmit filter v and sending the precoded downlink signal to UE 210. Upon reception at UE 210, where the signal received by UE 210 is expressible as $\vec{y}^{UE}=Hvs+n$, UE 210 updates receive filter w, power, and internal parameters, based on the precoded downlink signal and interference conditions. In another embodiment, only a subset of parameters are updated, such as only the receive filter or only a subset of the internal parameters or none of the internal parameters for the receiver, for example. Different users may have different resources for the sequences, wherein the different resources may differ in time domain, frequency domain, spatial domain (based on virtualized ports or layers), code domain (based on scrambling codes, e.g.), cyclic shift domain, etc. After updating the receive filter w, based on the downlink signal and interference conditions, backward training includes UE 210 using the receive filter w, or a modified or weighted form of the receive w, as a transmit filter and sends a precoded uplink signal to access node 205. Upon reception at access node 205, which uses the transmit filter v (with proper modification or weighting) as receive filter v and where the signal received by access node 205 is expressible as $\vec{y}^{AN}=H^Hws+n$, access node 205 updates transmit filter v, power, and internal parameters based on the precoded uplink signal and interference conditions. In another embodiment, only a subset of the internal parameters, such as only the receive filter, or none of the internal parameters are updated. The process may continue until convergence is achieved. It is noted that for forward training and backward training, the signal s is generally different, and noise (plus interference) is also generally different.

FIG. 3 is a flow diagram of example operations 300 occurring in a bi-directional training (BIT) process. BIT is generally a multi-stage process. Operations 300 begin with BIT initialization (block 305). BIT initialization includes at least one of: a selection of transmit filters; an exchange of device capabilities; an exchange of relationships between resources or signals; a configuration of measurement resources; a configuration of interference resources; a configuration of reference signals used in training; a configuration of a BIT trigger; a configuration of a BIT frequency or periodicity; a configuration of convergence threshold(s); a configuration of reports by the UE; a configuration of mapping of the antenna ports in the downlink and the uplink; a configuration of rank selection, adaptation, or trimming; a configuration of power adaptation; a configuration of relationship between the transmit filter in the uplink and receive filter in the downlink; QCL configuration between antenna ports an exchange of configuration information; a configuration of the cooperating access nodes, a configuration of synchronization between the cooperating access nodes, a configuration of rank distribution (or trimming) between the base stations, a configuration of updating the UE with the rank distribution; and so forth. A detailed description of the BIT initialization process is provided below. After initialization, the access node and the UE perform a BIT process (block 307). A detailed description of an example BIT process is provided below. The access node and the UE perform BIT-based data transmission (block 309). BIT-based data transmission comprises communications between the access node and the UE utilizing transmit filters and receive filters determined while performing BIT, e.g., the BIT process of block 307. It is noted that the BIT process does not have to be completed before the BIT-based data transmission starts, that is, the training and data transmission may occur at (or substantially at) the same time but on different resources. In addition, the BIT process may be embedded in data transmission, that is, the BIT training is performed on data transmission (such as based on the demodulation reference signal (DMRS) of the data transmission).

Figure 4:
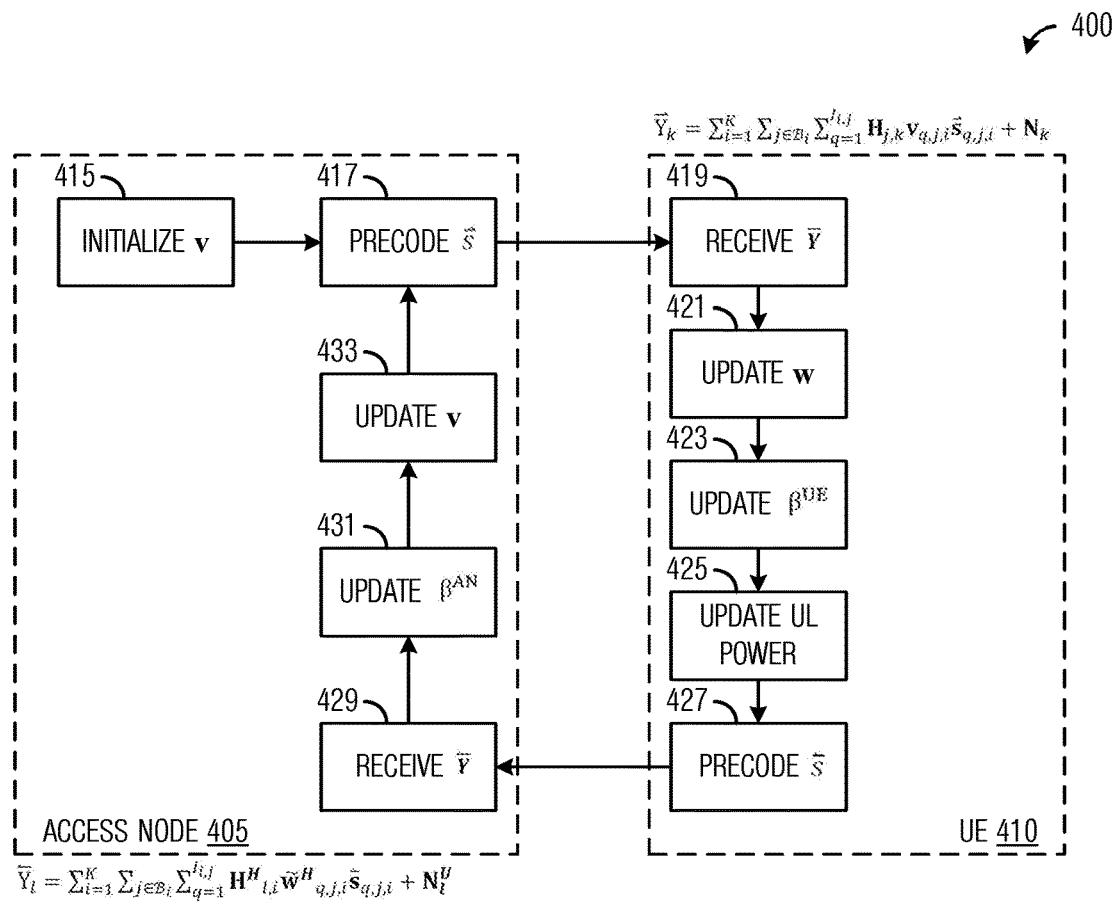
FIG. 4 illustrates a diagram of detailed view of an example BIT process according to example embodiments described herein.

FIG. 4 is a diagram 400 of a detailed view of an example BIT process. As shown in FIG. 4, the BIT process occurs at an access node 405 and a UE 410. The BIT process starts at access node 405 with access node 405 initializing transmit filter v (block 415). The initialization of the transmit filter v may include:

Access node 405 randomly selecting a transmit filter v within a port, such as from a Discrete Fourier Transform (DFT) codebook, for example.

Access node 405 uses a transmit filter v from a previously used beamforming stage, such as a previous beam sweeping stage, representing a coarse beamforming stage, for example. It is noted that if a rank of the transmission is four (although other values are possible), then four beams corresponding to the DFT codewords are applied.

Access node 405 uses a transmit filter v that is found while assuming a joint design with the BIT process in a subsequent stage for optimal beam selection.

Access node 405 uses a transmit filter v after UE 410 performs sounding using precoded or non-precoded sounding reference signals (SRS) and the transmit filter v is determined based on the precoded or non-precoded SRS received from UE 410.

Access node 405 uses a transmit filter v after UE 410 performs codebook search and selection and reports the precoding matrix indicator (PMI) and Rank Indicatior (RI) to access node 405. UE 410 may or may not feedback channel quality indicator (CQI) in addition to the PMI and the RI. It is noted that subsequent stages of the BIT may not require PMI feedback because the transmit and receive filters are derived from the received signal and interference, and therefore, are not codebook based. In other words, the candidate transmit filters may not be selected from a pre-defined codebook. Therefore, the PMI feedback is only used to find the initial transmit filter only during initialization of BIT.

In an embodiment, when the UE sounds a precoded SRS, a non-codebook based uplink MIMO mechanism may be used. Non-codebook based uplink MIMO mechanism may comprise:

1) The UE reports to the access node a number of SRS resources that the UE is capable of simultaneously transmitting. The UE may also report to the access node a number of SRS ports (or layers) that the UE is capable of simultaneously transmitting.

2) The access node configures one or more SRS resource sets for the UE. As an example, one SRS resource set may include up to four SRS resources (although other values are possible) for non-codebook based operation. The SRS resource set may be associated with a non-zero-power (NZP) channel state information reference signal (CSI-RS) resource (or resource set, transmitted by the access node), which is configured by radio resource control (RRC) signaling, for example. The number of SRS ports (or equivalently, layers) may be configured as the same as the ports (or layers) of the CSI-RS, with the SRS ports (or layers) corresponding to the CSI-RS ports (or layers) in a one-to-one fashion, or one-to-one mapping for example. The correspondence relationship between CSI-RS and SRS ports (or layers) may be referred to as port correspondence. The correspondence relationship may be based on the port or layer index preconfigured for the CSI-RS and SRS, such as CSI-RS port 0 (according to port definition in the Third Generation Partnership Project (3GPP) Technical Standard (TS) 38.211, which is hereby incorporated herein by reference in its entirety) being linked to SRS port 0 (according to port definition in 3GPP TS 38.211), CSI-RS port 1 being linked to SRS port 1, and so on. If multiple CSI-RS resources in a CSI-RS resource set are used to derive the SRS transmission or multiple SRS resources in a SRS resource set are used for one precoded sounding, an ordering may be based on all ports in the first resource of the resource set, then all ports in the second resource of the resource set, and so on. Multiple SRS resources in a resource set or multiple SRS resource sets may be used for sounding on all uplink transmission ports. Antenna switching for SRS can be adopted. Alternatively, port correspondence may not be used.

3) The UE determines candidate transmit filters based on the CSI-RS transmitted by the access node, where the UE uses channel reciprocity to determine the candidate transmit filters for the UL MIMO transmission. The candidate transmit filters are not be selected from a pre-defined codebook and thus the name "non-codebook based UL MIMO". To support candidate transmit filter determination, a CSI-RS, according to the above CSI-RS resource (set) configuration, is transmitted by the access node.

4) The UE applies the candidate transmit filters to the SRS and sends the precoded SRS on the SRS resources of the SRS resource set according to SRS configuration. One or more candidate filters may be applied on the SRS resource set if only one SRS resource set is configured. One or more candidate filters may be applied on the SRS resource sets if only multiple SRS resource sets are configured.

5) The access node receives the transmissions on the SRS resources or resource sets, and sends information, to the UE, about the transmit filter and rank to be used for subsequent transmission of PUSCH via Sounding Reference Indicator ((SRI) as defined in 3GPP TS 38.214, which is hereby incorporated herein by reference in its entirety) field in a DCI associated with the PUSCH. For example, SRS resource 1 in the resource set is selected and indicated, and the UE will apply the transmit filter used on resource 1 for the PUSCH transmission. More generally, the UE can determine its precoder for training or for PUSCH in addition to transmission rank based on the SRI (such as a wideband SRI, for example) field from the DCI. Subband (i.e., frequency selective) precoding or transmit filtering for the SRS and hence the PUSCH can also be allowed. In an embodiment, the BIT training process does not require this step, but the BIT uplink transmission as a result of uplink training can utilize this step.

The access node receives the precoded SRS on the SRS resources of the SRS resource set, determines the transmit filter v in accordance with the received precoded SRS. As an example, the access node receives an M-port SRS using its receive antennas and estimates co-channel interference, separates the signal (the precoded SRS) from the interference, and applies a downlink-oriented optimality criterion to determine the transmit filter as well as the transmission rank. In another embodiment, only the transmit filter is determined with no update on the transmission rank. In a further embodiment, the access node updates the receive filter v, and consequently, the transmit filter, based on the chosen precoded SRS resource signaled in the wideband SRI field in the DCI.

In an embodiment, the transmission rank of the PUSCH is determined by the UE, and the UE feedbacks the updated rank to the access node.

In an embodiment, when the UE sounds a non-precoded SRS, the access node uses the received non-precoded SRS to determine the transmit filter v. Then, in subsequent step, precoded CSI-RS and precoded SRS are used for BIT training.

In an embodiment, the beamformed or non-beamformed ports are sounded one at a time, as an example, four ports are sounded at a time (although other values are possible). In another embodiment, more than one group of SRS ports (e.g., a group of four ports (although other values are possible)) are used in the uplink and the sounded SRS ports are time division multiplexed (TDM) with a remainder of the ports, that is, the SRS ports may be configured in different SRS resources or different SRS resource sets and sounded at different symbols or slots. In yet another embodiment, antenna switching for SRS transmission is used on the beamformed or non-beamformed port to support sounding of all ports, wherein the antenna switching is defined according to clause 6.2.1.2 of 3GPP TS 38.214 for UE antenna switching. In another embodiment, the SRS ports are sounded using a combination of the previous mentioned techniques, such as, for example, within one group of SRS ports being sounded at a time, antenna switching on the SRS port to support the sounding of the ports within the group, and so on.

The access node precodes a downlink signal s using the transmit filter v (block 417) and transmits the precoded downlink signal to UE 410. UE 410 receives the precoded downlink signal (block 419). The precoded downlink signal, at a k-th UE (e.g., UE 410), may be expressed as:

$$\vec{Y}_k = \sum_{i=1}^{K} \sum_{j \in B_i} \sum_{q=1}^{I_{i,j}} H_{j,k} v_{q,j,i} \vec{S}_{q,j,i} + N_k \tag{2}$$

where $I_{i,j}$ refers to the number of layers sent from access node j to UE i, while $\vec{S}_{q,j,i}$ represents the set of cooperating serving access nodes serving UE i in a non-coherent joint transmission fashion, K is the number of UEs, $H_{j,k}$ is the channel model of the channels between the transmit antennas of access node j and the receive antennas of UE k, $\vec{S}_{q,j,i}$ is the downlink signal, and $N_k$ is the noise received at the receive antennas of UE k. Here, $v_{q,j,i}$ is the precoding vector for the q-th layer sent from access node j to UE i, and $\vec{S}_{q,j,i}$ is the signal for the q-th layer sent from access node j to UE i. The downlink signal $\vec{S}_{q,j,i}$ may be a reference signal known to access node j and UE i (e.g., a scrambling ID used to generate the reference signal (RS) is configured by access node j for UE i), and embodiments are provided below. For the same UE, the different layers are orthogonal using FDM, TDM, or CDM techniques. For different UEs, the signals may occupy different time or frequency resources (i.e., FDM or TDM), or occupy the same (e.g., partially or completely overlapped) time or frequency resources but generated with different scrambling IDs. More embodiment designs are provided below.

UE 410 derives or updates its receive filter w (block 421) and its SINR indicator $\beta^{UE}$ (block 423) and uplink transmit power (block 425). In another embodiment, the SINR indicator is not the indicator that the UE derives or updates but a different metric of the SINR indicator that implies the SINR indicator is derived or updated, for example, a mathematical function of the SINR indicator is updated or derived. UE 410 may update the receive filter w, SINR indicator $\beta^{UE}$, and uplink transmit power by using any of a variety of optimization techniques commonly used in wireless communications. As an example, UE 410 may use the precoded downlink signal (as received at UE 410) and make adjustments to the receive filter w, in one case the receive filter is derived in accordance with a minimum mean square error (MMSE) filter or weighted MMSE filter. In another embodiment the receive filter is a maximum ratio combining (MRC) filter or modified weighted MRC filter. In a different embodiment, the receive filter is an interference rejection combining (IRC) filter. In a further embodiment, the uplink filter is the same as the receiving filter further weighted by a weight for each transmission layer, such as uniform weights for all layers, or a per-layer signal plus interference to noise ratio (SINR) weight (or the square root of the SINR, a scaled version of the square root of the SINR, or a quantized version of the SINR, and so forth) for each layer, etc. In addition to making adjustments to the receive filter w, UE 410 makes adjustments or updates its SINR indicator $\beta^{UE}$, and uplink transmit power to maximize a SINR of the communications system, maximize a downlink CQI, maximize a channel capacity, probability of error, or so on. An example optimization technique may be similar to techniques used to optimize or maximize a MMSE combiner or MMSE-like combiner. A discussion of the mathematics involved in updating the receive filter w, SINR indicator $\beta^{UE}$, and uplink transmit power is provided below.

UE 410 uses the receive filter w as a transmit filter (denoted w̃ in FIG. 4 to distinguish from receive filter w) and precodes an uplink signal with the transmit filter w̃ (block 427) and transmits the precoded uplink signal to access node 405. Access node 405 receives the precoded uplink signal (block 429). The precoded uplink signal, received at an l-th access node (e.g., access node 405) may be expressed as:

$$\vec{Y}_l = \sum_{i=1}^{K} \sum_{j \in B_i} \sum_{q=1}^{I_{i,j}} H_{l,i}^H \tilde{w}_{q,j,i}^H \vec{S}_{q,j,i} + N_l^U \tag{3}$$

It is noted that receive filter w and transmit filter w̃ may be referred to as equivalent filters, where the two filters are equivalent when they are conjugate transposed versions of each other, conjugated versions of each other, scaled versions of each other, normalized versions of each other, or are identical to each other. In another embodiment, the receive filter and transmit filter (as described above) may be modified or weighted versions of each other with potentially different weights for each transmission layer such as for example using the SINR indicator or a function of the SINR indicator for weighting the transmission layers. Here, $\tilde{w}_{q,j,i}$ is the precoding vector for the q-th layer sent from UE i to access node j, and $\vec{S}_{q,j,i}$ is the signal for the q-th layer sent from UE i to access node j. The uplink signal $\vec{S}_{q,j,i}$ may be a reference signal known to access node j and UE i (e.g., the scrambling ID used to generate the RS is configured by access node j to UE i), and embodiments are provided below. For the same UE, the different layers are orthogonal using FDM, TDM, or CDM techniques. For different UEs, the signals may occupy different time or frequency resources (i.e., FDM or TDM), or occupy the same (e.g., partially or completely overlapped) time or frequency resources but generated with different scrambling IDs. More embodiment designs are provided below. Similar to the downlink case described above, this resembles probing in uplink.

Access node 405 updates its receive filter ṽ (which is also equivalent to its transmit filter v) and its per-layer SINR indicator $\beta^{AN}$ (blocks 431 and 433). Access node 405 may update the receive filter ṽ, and SINR indicator $\beta^{AN}$ using any of a variety of optimization techniques commonly used in wireless communications. As an example, access node 405 may use the precoded uplink signal (as received at access node 405) and make adjustments to the receive filter ṽ, and SINR indicator $\beta^{AN}$ to maximize a SINR of the communications system in a manner similar to UE 410 described previously. It is noted that updating receive filter ṽ is similar to updating transmit filter v because they are the equivalent. As discussed previously, the two filters are equivalent when they are conjugate transposed versions of each other, conjugated versions of each other, scaled versions of each other, normalized versions of each other, or are identical to each other. In a multi-transmission layer deployment, the two filters may be weighted versions of each other, with potentially different weights for each transmission layer, such as weighted by the per-layer SINR indicator $\beta^{AN}$ or function of the per-layer SINR indicator. In an embodiment, the update of the receive filter ṽ is based on an optimization criterion for the uplink transmission, such as to maximize the uplink received post-combining SINR, maximize the uplink rate or throughput for this link or for multiple links, minimize the uplink received mean squared error, etc. In another embodiment, the update of the receive filter ṽ is based on an optimization criterion for the next downlink transmission, such as to maximize the downlink received post-combining SINR, maximize the downlink rate or throughput for this link or for multiple links, maximize the downlink rate or throughput based on some global downlink utility (an example of the update rules are provided below), minimize the downlink received mean squared error, etc.

Until an end criterion is met, access node 405 and UE 410 continue the BIT process. Examples of end criterion may include a convergence criteria related to communications system capacity is met, a SINR threshold being met, a number of times the BIT process is repeated (blocks 417-433), a configured number of times that BIT process is performed by the access node (or UE) is met, and so on. It is noted that although the discussion focuses on the use of SINR thresholds and indicators other metrics may also be used, such as signal to noise ratio (SNR) thresholds and indicators. Therefore, the focus on SINR should not be construed as being limiting to either the scope or spirit of the example embodiments. The above-mentioned number of times that BIT training is performed may be configured or determined differently for different settings; for example, if the training overhead (RS overhead used for BIT training) is higher, or if the channels or traffic loads are more stable, the number of times that BIT training is performed may be smaller, and vice versa. Under conditions such as stationary access nodes and UEs and stable traffic loads, if a significant portion of a slot is used for BIT training in both the downlink and uplink to provide high processing gains, a single iteration may already provide acceptable performance for data communications. Otherwise, 3~4 iterations may generally be sufficient. However, if rank adaptation (rank increase or rank trimming) is involved, more (e.g., 5~10) iterations may be needed. In another embodiment, the access node and the UE keep track of the BIT training and the BIT training continues to account for the continuously changing channel. In another embodiment, the network might decide to terminate the tracking and BIT training, and thus stopping the BIT training. Such a scenario may be good for relatively quasi static channel. In this case, signaling (DCI, MAC, or RRC, for example) is used to indicate the termination of the BIT process. In this case, the access node (or the network) decides on a periodicity of the BIT training for further refinement of the precoders and combiners. The BIT training may operate in parallel with data transmission, driven by traffic dynamics, channel variations, etc. As an example, in a deployment where the channels vary continuously, the BIT training is performed continuously so that the precoders or combiners are updated according to the changing channels, hence, maintaining high transmission efficiency over time.

An example technique that may be used to update w, $\beta^{BE}$, v, $\beta^{AN}$, and uplink transmit power may be as follows, which is derived and approximated from solutions used to maximize a global downlink utility. The receive filter w may be expressed as:

$$w_{p,l,k} = \left(\frac{1}{M}\bar{Y}_k\bar{Y}_k^H + \frac{\lambda_k}{\beta^{UE}_{p,l,k}\|w^{(t-1)}_{p,l,k}\|^2 + \epsilon}I\right)^{-1}\frac{1}{M}\bar{Y}_k\bar{s}^H_{p,l,k} \quad (4)$$

where $\beta^{UE}$ is a SINR indicator at UE 410, $\in$ represents a small positive number to avoid division by zero errors, M is the length of the downlink signal s, and $\lambda_k$ is an optimization parameter over which UE 410 searches to update the receive filter w. Furthermore, $W^{(t-1)}_{p,l,k}$ is the receiver filter used in the previous iteration, which needs to be stored. The SINR indicator at UE 410, $\beta^{UE}$, is expressible as:

$$\beta^{UE}_{p,l,k} = \left(1 - 2\text{Re}\left\{\frac{w^H_{p,l,k}\bar{Y}_k\bar{s}^H_{p,l,k}}{M}\right\} + \frac{w^H_{p,l,k}\bar{Y}_k\bar{Y}_k^H w_{p,l,k}}{M}\right)^{-1} \quad (5)$$

where Re{ } is a function returning a real portion of { }, and the above for $\beta^{UE}$ is for a k-th UE (e.g., UE 410), l-th access node, and p-th layer. When calculating w, the $\beta^{UE}_{p,l,k}$ from the previous iteration may be used to avoid the difficulty of jointly determining w and $\beta^{UE}_{p,l,k}$. The transmit filter v is expressible as:

$$v^{BIT}_{p,l,k} = \left(\frac{1}{M}\bar{Y}_l\bar{Y}_l^H - \sigma_v^2 I_{N_t} + \mu_l I + \frac{\eta_l}{\|v^{(t-1)}_{p,l,k}\|^2 + \epsilon}\right)^{-1}\frac{1}{M}\bar{Y}_l\bar{s}^H_{p,l,k}\sqrt{\alpha_k\hat{\beta}^{BS}_{p,l,k}} \quad (6)$$

where $\mu_l$ and $\eta_l$ are optimization parameters of which access node 405 searches to update the transmit filter v. The SINR indicator at access node 405, $\beta^{AN}$, is expressible as:

$$\hat{\beta}^{AN}_{p,l,k} = \left(\frac{a^* + \sqrt{|a|^2 + 4}}{2}\right)^2, a_{p,l,k} = \frac{v^H_{p,l,k}\bar{Y}_l\bar{s}^H_{p,l,k}}{\sqrt{\alpha_k}\,M} \quad (7)$$

where $\alpha$ is an internal parameter specific to UE 410.
The uplink transmit power may be updated in accordance with:

$$\|w^U_{p,l,k}\|^2 = \alpha_k\beta_{p,l,k}\|w_{p,l,k}\|^2 \quad (8)$$

where $\beta_{p,l,k}$ is equal to 1+SINR. Therefore, the total power of UE 410 is:

$$p^U = \Sigma_{l\in\mathcal{B}_k}\Sigma_{p=1}^{l_k}\|w^U_{p,l,k}\|^2 = \alpha_k\Sigma_{l\in\mathcal{B}_k}\Sigma_{p=1}^{l_k}\beta_{p,l,k}\|w_{p,l}\|\mu^2 \quad (9)$$

where $l_k$ is the total number of layers for k-th UE. If $P^U > P_k$ then the power may be reduced proportionally to $P_k$, where $P_k$ is the total available uplink power (e.g., Pcmax configured for the UE). Hence, the actual uplink filter is expressible as:

$$\tilde{w}^U_{p,l,k} = \frac{\sqrt{\alpha_k\beta_{p,l,k}}\,w_{p,l,k}}{\sqrt{P^U/P_k}} \quad (10)$$

It is noted that $$\frac{\alpha_k}{\sqrt{P^U/P_k}}$$

is equivalent to scaling fairness control variable $\alpha$:

$$\tilde{\alpha}_k = \frac{\alpha_k}{\sqrt{P^U/P_k}} \quad (11)$$

It is also noted that uplink power control is effectively fairness control. The power control technique may be a per layer uplink power adaptation technique and is used to scale the transmit filter. In other words, the power control technique modifies the receive filter used in the uplink for uplink transmission. The per layer power control is derived in accordance with a function related to the inverse of the SINR of each transmission link.

Figure 5:
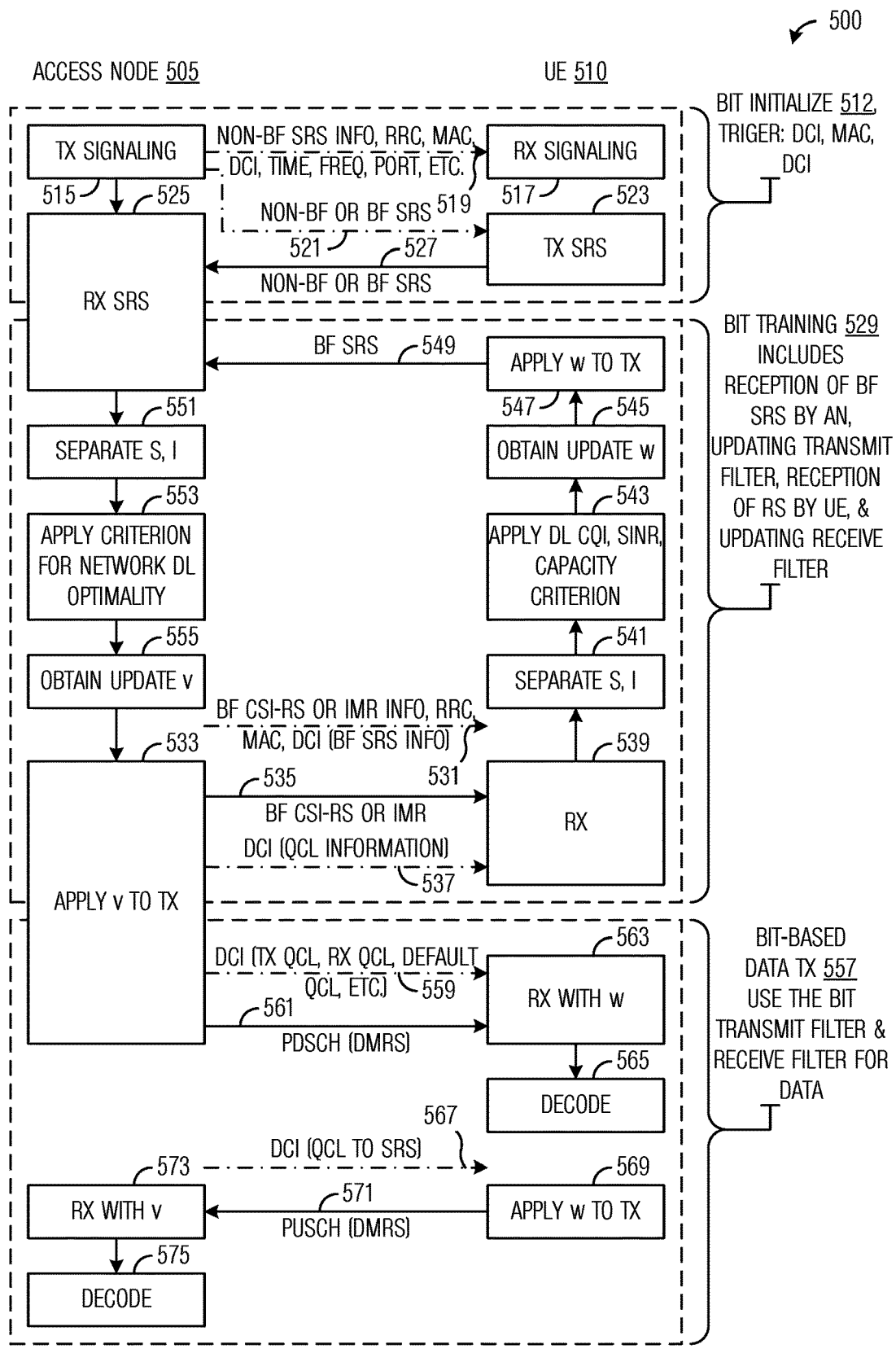
FIG. 5 is a diagram highlighting signaling exchanged and processing performed by devices performing BIT and BIT-based transmission according to example embodiments described herein.

FIG. 5 is a diagram 500 highlighting the signaling exchanged and the processing performed by devices performing BIT and BIT-based transmission. Diagram 500 displays example signaling exchanged and processing performed by an access node 505 and a UE 510 performing BIT and BIT-based transmission.

BIT begins with a BIT initialization stage 512. BIT initialization stage 512 may include access node 505 transmitting signaling configuration information (block 515) to UE 510 and UE 510 receiving configuration information (block 517). The configuration information may include non-beamformed SRS information that informs UE 510 about time, frequency, or port resources allocated to UE 510 to transmit non-beamformed SRSs. The configuration information may also include other information. The configuration information may be sent to UE 510 using RRC, MAC, or DCI messaging. The configuration information may also include information about which form of SRS UE 510 should transmit, either non-beamformed SRS or beamformed SRS, for example. Access node 505 also transmits a precoded RS as part of the signaling. UE 510 transmits SRSs to access node 505 (blocks 523 and 525). UE 510 transmits either non-beamformed SRS or beamformed SRS (event 527), as specified by access node 505, for example. It is noted that this stage does not need to be dedicated solely for BIT. This stage may be adopted for non-BIT oriented sounding. This stage may be configured for purposes other than BIT and run for some time (which may be specified or until a criterion is met, for example), and the network determines when to start BIT based on this stage. Even after the BIT is done with initialization and is performing iterations, this stage of sounding may still be performed for other purposes, such as for beam refinement purposes.

BIT initialization stage 512 may include BIT configuration and triggering the BIT process. The signaling of the BIT configuration may be performed using RRC, MAC, or DCI signaling. In an embodiment, a dedicated bit or bits in DCI is used to trigger the BIT process in periodic, semi-persistent, or aperiodic mode with RRC higher layer configuration. In another embodiment, a new RRC configured transmission mode is used to trigger the BIT process. In another embodiment, a new MAC state is first configured by RRC and then activated by MAC signaling to trigger the BIT process. In another embodiment, RRC signaling is used to configure the BIT process in periodic, semi-persistent, or aperiodic mode. In another embodiment, access node 505 may not explicitly trigger the BIT process, but the BIT process is implicitly triggered following an initial coarse beamforming stage, for example. In such as case, BIT is used to further refine the beams that have been found using the stage prior to the BIT. In another embodiment, the access node configures or specifies (via RRC, MAC, or DCI signaling) that a UE behavior to be expected, and the UE performs the expected behavior. The expected UE behavior may be BIT training operation to be done by the UE, and by specifying so, the BIT training process effectively starts. The expected UE behavior may include one or more steps corresponding to 539, 541, 543, 545, 547, and 549, and will be further discussed later.

BIT training 529 is a stage of the BIT process. In BIT training 529, precoded downlink signals and precoded uplink signals are transmitted by access node 505 and UE 510, respectively, to allow for the device receiving the precoded signals to update their respective receive filters and then the transmission precoding filter, or update the transmission precoding filter directly. BIT training 529 may be an iterative process that continues until an end criterion is met, or when a signaling (RRC, MAC, or DCI) is received to specify stopping BIT or to specify a process different than BIT starts. BIT training 529 may occur in parallel with data transmissions. As an example, data transmission may commence after transmit and receive filters have been determined, even before they have been refined through successive iterations of BIT training 529. Examples of end criterion include a SINR meets a specified criterion (such as SINR change from last iteration is smaller than a threshold (e.g., 0.2 dB), SINR has reached a certain threshold (e.g., >10 dB which can already support relatively high rate)), a number of times the precoded downlink and uplink signals have been transmitted, and so on. In another embodiment, BIT training 529 is not stopped to enable a tracking of channel changes by the transmit and receive filters. In another embodiment, BIT training 529 is discontinued and the tracking of the channel changes is also discontinued.

An initial iteration of BIT training 529 includes access node 505 signaling information about resources associated with signal reception (which are referred to herein as channel measurement resources (CMRs)) or information about resources associated with interference transmission (which are referred to herein as interference measurement resources (IMRs)) to UE 510 (event 531). In other words the UE is configured by the access nodes with resources for channel measurement (or signal reception) and interference measurement. CMRs may be precoded downlink RSs, such as NZP CSI-RS, that are used by UE 510 to make measurements of the signals transmitted by access node 505 to UE 510 or channels between access node 505 and UE 510, and find best receive beams or generally, properties of the received signals to update UE UL precoder. Downlink signals are not limited to CSI-RS, may also include data (in physical downlink shared channels (PDSCHs)), DMRS for data PDSCH, other examples of signals are mentioned below. In some sense, the CMRs are not CMRs for channel measurement or estimation in the traditional sense, instead, the CMRs are just time or frequency resources on which the UE is configured to receive some or all layers of intended signals to be utilized for a subsequent step of the BIT process. Channel estimation may not be performed on these CMRs. Each port of the CMR is assumed by the UE as a layer of an intended signal. The UE does not need to extract the intended signal such as by sequence detection (though it may do so), instead the UE utilizes the intended signal(s) received on the resources to compute or derive a receive combiner or a transmit precoder.

IMRs are typically for signal transmissions from an access node to other UEs and may be used by UE 510 to find best receive beams, for example. In another embodiment, the IMRs are resources on which the UE processes the received transmission(s) to refine the receive beams found by considering the received signal without interference. IMRs may also be used to measure interference. In some sense, the IMRs are not IMRs for interference measurement in the traditional sense, instead the IMRs are just time or frequency resources on which the UE is configured to see or receive some or all layers of interfering signals to be utilized for a subsequent step of the BIT process. The UE does not need to extract the interfering signal (though it may do so), instead the UE utilizes the interfering signal(s) received on the resources to compute or derive a receive combiner or a transmit precoder.

Figure 6A:
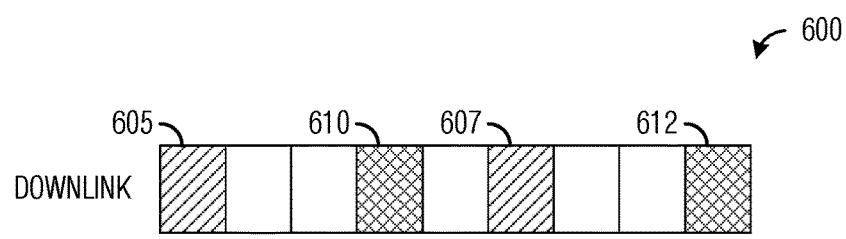
FIG. 6A illustrates example resources highlighting CMRs and IMRs according to example embodiments described herein.
Figure 6A:
Figure 6A:

FIG. 6A illustrates example resources 600 highlighting CMRs and IMRs. Resources 600 include downlink resources allocated for channel measurement, such as resources 605 and 607, and resources allocated for interference measurement, such as resources 610 and 612. The resources allocated for channel measurement are conveying NZP-CSI RS and the resources allocated for interference measurement are conveying ZP-CSI RS, for example. FIG. 6B illustrates example relationships 650 between CMRs and IMRs and resource elements of orthogonal frequency division multiplexed (OFDM) symbols or physical resource blocks (PRBs). NZP CMRs 655 and 657 may occupy all resource elements of the OFDM symbols or PRBs, or only a subset of it, such as shown in relationship 659. ZP IMRs 665 and 667 may occupy all resource elements of the OFDM symbols or PRBs, or only a subset of it, such as shown in relationship 669. The CMRs and IMRs may overlap.

In an embodiment, the UE correlates the received signal (including intended signal, interfering signal, and noise) with a sequence representing the intended signal for a layer to derive a receive combiner for the layer, wherein the sequence may be generated from a scrambling ID associated with the transmitted signal and the scrambling ID has been configured for the UE for the associated CSI-RS or DMRS resources, for example. In an embodiment, the UE correlates the received signal (including intended signal, interfering signal, and noise) with a sequence representing the intended signal for a layer and also determines a SINR indicator (which reflects the post-combining per-layer SINR, or an indicator that implicitly implies the SINR indicator or computes directly a function of the SINR indicator for the layer used to weight the precoder) for the layer to derive a receive combiner or a transmit precoder for the layer, wherein the SINR indicator is obtained by assuming the intended signal is the signal on the CMR(s) and represented by the sequence, and assuming that the interfering signal(s) is the interference signal on the IMR(s), and wherein the receive combiner or a transmit precoder for the layer is weighted by a function of the SINR indicator for the layer. Example CMR resources include NZP CSI-RS resources configured for channel and interference measurement, NZP CSI-RS resources configured for channel measurement, DMRS resources, PDSCH resources, and so on. Example IMR resources include NZP CSI-RS resources configured for channel and interference measurement, NZP CSI-RS resources configured for channel measurement, NZP CSI-RS resources configured for interference measurement, zero-power (ZP) CSI-RS resources configured for interference measurement, CSI interference measurement resources, DMRS resources, a new DL RS or RS resource, PDSCH resources, and so on. Access node 505 coordinates with other access nodes (especially those in close proximity to access node 505) to determine CMRs and IMRs. The CMR information or IMR information provides UE 510 information about the CMRs or IMRs transmitted by access node 505, such as time, frequency, or port resource information. The CMR information or IMR information may be signaled to UE 510 using RRC, MAC, or DCI messaging. The CMR information or IMR information may also be included with the beamformed SRS information signaled by access node 505 in event 519.

In an embodiment, the CMRs are used to find the receive filter of UE 510. The CMRs may also include interference from other access nodes performing BIT training as indicated by the network, for example. UE 510 knows that interference is also present on the CMRs, from the information signaled in event 531. In other words, the resources on which the UE may be configured to receive the intended signal layers may partially or completely overlap with the resources on which the UE may be configured to receive interfering signal layers. Still, the UE does not have to perform signal sequence detection (though it may do so), but correlation with the intended signal sequence can be performed, on the overlapped resources, based on the total received signal (e.g., according to the equations with $\vec{s}_{q,j,i}$, $W_{p,l,k}$, and $\beta_{p,l,k}^{UE}$ above). In an embodiment, the interference on the CMRs are not considered and the UE performs MRC (and the like) for the signals to derive or update the receive filter.

Access node 505 applies transmit filter v to a downlink signal, such as a downlink RS (block 533) and transmits the precoded downlink signal to UE 510 (event 535). The transmission comprises the signals transmitted on one or more transmission ports, on the dedicated configured resources and each transmission port corresponds to a transmission layer, and a number of transmission layers of the first transmission corresponds to a rank of the transmission.

The UE also receives interference on interference resources associated with interference resources. These interference resources may or may not overlap with channel measurement resources. The UE finds the receive filter w in accordance with the downlink signal transmission and the received interference. In other words, the receive filter w of the UE is found in accordance with the received transmission and the received interference on resources associated with signal reception and interference transmission. In another embodiment, when the uplink precoder is an analog combiner, the analog beams in the downlink are chosen in accordance with the measured downlink signal and interference which may or may not be different from the beam chosen in accordance with the measured downlink signal only.

In an embodiment, the receive and transmit filters of the transmissions are derived on per sub band basis, consisting of a bundle of resource blocks, and the per sub band precoders are based on the received signal and interference. The receive and transmit filters are derived separately on a per sub band basis. The size of the sub band depends on the channel frequency selectivity conditions, for example. The subband size may be updated depending on the change in the channel conditions. In another embodiment, the receive precoders are derived on a per sub band basis, while the transmit precoder is a wideband precoder, where the precoder may perform well for relatively flat fading channels. In yet a further embodiment, the receive filter and consequently the transmit filter are chosen to maximize a utility over the entire bandwidth in other words wideband precoder.

The IMRs may be used for power estimation or covariance estimation of interference from interfering access nodes that are not related to signals intended for the UE. Although the IMRs are used for power estimation or covariance estimation, the interference may be treated as noise at UE 510. In an embodiment, the power of transmissions of interfering access nodes that are not cooperating in the BIT process is ignored, because the cooperation process involves all (or nearly all) nearby access nodes that may cause strong interference and hence the power from non-cooperated access nodes is typically very small, for example, and is treated in a manner similar to noise. However, the power of interfering access nodes that are cooperating in the BIT process are considered to be part of the received downlink signal by UE 510 and need not be subtracted. In an embodiment, IMRs are allocated in an overlapping fashion so that a reduction in overhead is achieved, when compared to a situation where dedicated IMR resources are allocated for each access node, for example. In an embodiment, a full overlap of downlink resources is supported. The full overlap of downlink resources is a way to enable the UE to capture all of its interference, including intra-cell and inter-cell interference. In an embodiment, a partial overlap or no overlap of downlink resources is supported. The partial overlap or no overlap of downlink resources may lead to more overhead, and the UE may need to aggregate interference on separate resources to obtain the total interference. In any case, all of the interference that the UE would experience in associated data transmissions should be present so that the UE is able to capture all of them when deriving the receiver combiner to reduce interference. The generally requires the access nodes to transmit training signals and data synchronously. The concept is similar to probing or pre-scheduling provided in U.S. patent applications: application Ser. No. 14/080,061, filed Nov. 14, 2013, entitled "Systems and Methods for Adaptation and Reconfiguration in a Wireless Network", application Ser. No. 15/244,783, filed Aug. 23, 2016, entitled "Systems and Methods for Adaptation in a Wireless Network", application No. 62/588, 176, filed Nov. 17, 2017, entitled "System and Method for Wireless Channel Measurement", and application No. 62/670,464, filed May 11, 2018, entitled "System and Method for Wireless Channel Measurement", which are incorporated herein by reference respectively in their entirety. One difference from traditional probing is that in traditional probing, the probed result at the receiver side is fed back to the transmitter, such as with CQI feedback, but in BIT, the probed result at the receiver side is sent via the reverse link RS, reflected in the RS's precoding, power, etc.

Access node 505 signals quasi-co-located (QCL) information to UE 510 (event 537). The QCL information specifies a relationship between two or more reference signals or data signals (e.g., CMRs and IMRs) such that the two signals may be viewed as possessing similar characteristics. As an example, in a one-to-one QCL relationship, a receive beam for CMRs and a receive beam for IMRs are the same. It is also possible that multiple signals are associated with a single signal. The UE may assume that the antenna ports for a signal are quasi co-located with the antenna ports of another signal with respect to Doppler shift, Doppler spread, average delay, delay spread, spatial Rx parameters, and so on, where applicable. Information related the quasi co-location types may be conveyed to the UE using a higher layer parameter QCL-Type, for example. Example types of the parameter QCL-Type may include (It is noted that the parameter may include a combination of the example types listed below):

QCL-TypeA': {Doppler shift, Doppler spread, average delay, delay spread},
QCL-TypeB': {Doppler shift, Doppler spread},
QCL-TypeC': {average delay, Doppler shift},
QCL-TypeD': {Spatial Rx parameter}.

A QCL relationship may signaled to a UE to inform the UE that the same receive beam may be used for CMRs and IMRs, for example. As an example, the QCL information may be signaled in DCI messaging. The DCI messaging may include information about a CMR with aperiodic RSs (such as CSI-RS, for example) and triggering, as well as, IMRs with aperiodic IMR triggering. Joint or separate DCI messaging may be used to provide information for different resources. In an embodiment, the UE assumes that the CMR resource(s) (e.g., CSI-RSs) for channel measurement and IMR resource(s) (e.g., CSI for interference measurement (CSI-IM) or NZP resources) have QCL relationships, e.g., the CMR resource(s) and the IMR(s) have a spatial QCL relationship TypeD (i.e., QCL-TypeD'). In an embodiment, the UE utilizes the QCL relationship between the CMR and IMR to derive CQI. The availability of the QCL relationship between CMR and IMR implies that the same receive beam is usable for both CMR and IMR reception. In an embodiment, the QCL relationship is not utilized. As an example, in a UE with full digital processing capability, the UE receives the CMR and IMR, and jointly determines the receive beam that is applied to both the signal reception and interference reception. In a situation with overlapped CMR and IMR, the UE may be configured with only CMR for the BIT process but a QCL-TypeD' relation is specified for the CMR, then the UE interprets that the CMR is configured with overlapped CMR and IMR.

UE 510 receives the precoded downlink signal using receive filter w (block 539). It is noted that the UE does not need to be aware of whether the signal is precoded or not. The UE handles the signal in a similar manner, independent of precoding. The precoded downlink signal includes CMRs (e.g., the downlink RS) and may include IMRs. When UE 510 receives the precoded downlink signal, UE 510 is expecting to receive both the downlink signal and the associated interference. In such a situation, the QCL relationships cover not only the downlink signal but also the interference. For a reception of unicast downlink data channels based on BIT training (e.g., block 537), spatial QCL relationships are supported between a joint downlink RS with interference and DMRS antenna port(s) of the downlink data channel, with the information regarding the RS antenna port(s) being sent using DCI messages. In an embodiment, UE 510 separates the downlink signal (s) and the interference (i) from the received precoded downlink signal (block 541). In an embodiment, UE 510 removes the downlink signal s (which is known to UE 510) leaving the interference i. UE 510 may make use of interference cancellation receiver capabilities, for example. UE 510 applies an optimization technique to find an update for the receive filter w (blocks 543 and 545). In other words, UE 510 derives an updated receive filter w. UE 510 may also compute or determine the receive filter w. As an example, UE 510 uses the optimization technique to maximize a downlink CQI, a SINR of the communications system, a channel capacity, a probability of error, or so on, to update the receive filter w, and some embodiments have been discussed above (such as those based on some global utility) and can be combined here. In an embodiment, UE 510 does not use interference cancellation receiver capabilities (or UE 510 is not interference cancellation capable). As an example, if UE 510 uses interference cancellation receiver capabilities for data reception, then UE 510 determines the receive filter w using similar assumptions. In this situation, UE 510 receives and estimates the downlink signal s and the interference i, then UE 510 derives the receive filter w, as well as resulting CQI, SINR, channel capability, probability of error, and so on. The receive filter w (or an equivalent version thereof) is also used as transmit filter, also denoted w. As discussed previously, the two filters are equivalent when they are conjugate transposed versions of each other, conjugated versions of each other, scaled versions of each other, normalized versions of each other, or are identical to each other. In a multi-transmission layer deployment, the two filters may be weighted versions of each other, with potentially different weights for each transmission layer. In an embodiment, UE 510 does not derive the receiver filter w but directly derives the transmit filter w. This direct derivation of the transmit filter w can be done for the BIT iterations involving only training but no DL data transmission. That is, the derivation of the receiver filter is needed only for DL data transmission but not necessary for BIT training. It is noted that the expected UE behavior as specified by the access node configuration or indication for the UE may be only the derivation of the transmit filter w based on the associated CMR and optional IMR. Other UE behavior such as an intermediate step of deriving a hypothetical receive filter w based on the associated CMR and optional IMR and then obtaining the equivalent transmit filter may be done by the UE as part of the UE implementation but the network configuration or standard specifications do not need to specify those.

UE 510 applies the transmit filter w to an uplink signal, such as an uplink RS (block 547). The uplink RS may be SRSs, DMRSs, or any other RS, for example. In an embodiment, the uplink RS may be UL data that can be decoded correctly by access node 505. UE 510 transmits the precoded uplink signal to access node 505 (event 549). This step may be combined with the previous step of deriving or updating the transmit filter w, and the expected UE behavior as specified by the access node configuration or indication for the UE may include the transmission of the uplink RS in accordance with the associated CMR and optional IMR. Access node 505 receives the precoded uplink signal using receive filter v (block 525). It is noted that the access node does not need to be aware of whether the signal is precoded or not. Access node 505 separates the uplink signal (s) and the interference (i) from the received precoded uplink signal (block 551). Access node 505 applies an optimization technique to find an update for the receive filter v (blocks 553 and 555). In other words, access node 505 derives an updated receive filter v. Access node 505 may also compute or determine the receive filter v. As an example, access node 505 uses the optimization technique to optimize overall communications system downlink performance, and some other embodiments have been provided above and can be combined here. Access node 505 may use the same optimization technique used by UE 510, for example. The second transmission is transmitted on one or more second transmission ports. In one embodiment, the first number of transmission layers of the first transmission and a second number of transmission layers of the second transmission are the same. As discussed previously, the two corresponding filters are equivalent when they are conjugate transposed versions of each other, conjugated versions of each other, scaled versions of each other, normalized versions of each other, or are identical to each other. In another embodiment, the number of transmission in the second transmission is different than the number of transmission layers in the first transmission. The access node signals updates the UE with the number of transmission layers in subsequent transmissions. In an embodiment, the access node does not derive the receiver filter v but directly derives the transmit filter v. This can be done for the BIT iterations involving only training but no UL data transmission based on BIT. That is, the derivation of the receiver filter is needed only for UL data transmission based on BIT but not necessary for BIT training.

Because BIT training 529 is an iterative process, the signaling exchanged and processing performed by access node 505 and UE 510 described as part of BIT training 529 may be repeated one or more additional times, until an end criterion is met. As an example, BIT training 529 may be configured to repeat a specified number of times, such a 1, 2, 3, 4, or so on, and some other embodiments have been provided above and can be combined here. A fixed number of repetitions may be advantageous in provided a consistent latency for BIT training 529. As another example, a specified duration is used to stop BIT training 529. In this embodiment, BIT training 529 continues until the specified duration after start of BIT training 529 has elapsed. As another example, BIT training 529 may be configured to repeat until a performance criterion is met. Examples of the performance criterion may be a SINR of a channel between access node 505 and UE 510 meets an SINR threshold, a data rate of the channel meets a data rate threshold, an error rate of the channel meets an error rate threshold, and so on. In another embodiment, BIT training is repeated until convergence of a metric such as channel capacity. In further embodiment, the access node configures the number of iterations, the access node signals the number of iterations to the UE. The specified number of times and the performance criterion may be examples of the end criterion. Other end criterion may be possible.

In a situation where a performance criterion is used to stop BIT training 529, either access node 505 or UE 510 or both access node 505 and UE 510 may perform checks to determine if the performance criterion is met. In an embodiment, if either an access node or a UE determines if the performance criterion is met, the device (either the access node or the UE) will signal the other device (the UE or the access node) that the performance criterion is met and BIT training should stop. The signaling may be performed using MAC, RRC, or DCI signaling, for example. In an embodiment, only an access node can stop BIT training. In other words, even if the UE determines that the performance criterion is met, the UE (and the access node) continues BIT training and waits until the performance criterion is met at the access node and the access node signals the UE to stop BIT training. In an embodiment, a combination of performance criterion and specified number of times or specified duration is used to stop BIT training. The use of the combination of performance criterion and specified number of times or specified duration places an upper bound on the amount of time spent on BIT training. In an embodiment, the access node signals the UE with another transmission mode or state not associated with BIT, and then the BIT process stops.

BIT-based data transmission 557 may commence once BIT training 529 completes. BIT-based data transmission 557 may also commence while BIT training 529 is still ongoing, although the transient performance achieved before BIT training 529 completes may not be optimal. BIT-based data transmission 557 involves the transmission or reception of signals transmitted using transmit filter v and receive filter w or transmit filter w and receive filter v. Access node 505 may send information associated with CQI for different data layers and the receive filter w (event 559). As an example, the information may include QCL relationships between downlink RS ports and DMRS or data for both transmission (e.g., gain, delay spread (DS), and so on) and reception (e.g., receive beamforming, and so on). Some of the QCL types (e.g., QCL-TypeD' and QCL-TypeA') may be signaled for the BIT resources and BIT-based data transmission resources. The information may also include default QCL information, and so on. UE 510 uses the information to determine that the forth coming precoded downlink data transmission has a QCL relationship with the downlink RS ports and also has a QCL relationship with the receive filter w. In a situation involving the reception of unicast downlink data, the information from access node 505 may provide UE 510 with information about a spatial QCL relationship between the downlink RS antenna port(s) and the DMRS antenna port(s) of the downlink data channel. The information may be sent using DCI messaging. In an embodiment, the QCL relationship is not between the DMRS antenna port(s) of the PDSCH and a receive filter at the UE, but between the DMRS antenna port(s) of the PDSCH and CMR or IMR as configured or indicated by the access node, and the QCL is based on the latest CMR or IMR received at least a specified number of slots earlier. This is because the UE may not need to derive any receive filter for the BIT training and hence the QCL should refer to the resources that are used to derive the uplink precoder. The specified number of slots is to ensure the UE has enough time to process based on the CMR or IMR and generate the receive filter. During the BIT iterations, because the transmissions on the CMR or IMR are updating over time, time-domain filtering should be restricted to only the resources specified by the access node or standard specifications. For example, a measurement restriction may be configured. The CSI-timeRestrictionForChannelMeasurements ReportConfig may also contain information enabling the configuration of a time domain restriction for channel measurements and timeRestrictionForInterferenceMeasurements may contain information enabling the configuration of a time domain restriction for interference measurements. If configured as "On", then the CMR or IMR in one slot is used for deriving the PDSCH receive filter based on the QCL. As time elapses and new CMR or IMR are received by the UE, the PDSCH receive filter can be updated accordingly.

Access node 505 precodes a downlink data transmission, e.g., a PDSCH, and sends the precoded downlink data transmission to UE 510 (events 533 and 561). The downlink data transmission is precoded using the transmit filter v determined in BIT training 529, for example. Access node 505 may also update a modulation and coding scheme (MCS) level used in the downlink data transmission. UE 510 receives the precoded downlink data transmission (block 563). UE 510 uses a receive filter w, determined in BIT training 529, to receive the precoded downlink data transmission, for example. UE 510 decodes the received downlink data transmission (block 565). In an embodiment, if the receiver filter is not derived during the BIT training stage, the receiver filter can be derived in accordance with the DMRS (and optionally, jointly with the QCLed BIT resources) for the data transmission and then applied to receive the data.

Access node 505 sends QCL information (or SRI information) related to the SRS transmitted by UE 510 to UE 510 (event 567). The QCL or SRI information may be sent in a DCI message, for example. The QCL or SRI information may assist UE 510 in determining a transmit beam to use to transmit an uplink data transmission. UE 510 precodes an uplink data transmission, e.g., a physical uplink shared channel (PUSCH), and sends the precoded uplink data transmission to access node 505 (events 569 and 571). The uplink data transmission is precoded using the transmit filter w determined in BIT training 529, for example. As an example, UE 510 transmits an r port RS (e.g., SRS, DMRS, and so on) precoded with transmit filter w. In a situation where uplink MIMO is used, an association between the SRS and downlink RS may be established for non-codebook based. When uplink MIMO is used, UE 510 may estimate the downlink RS and selects a precoder based on some optimization criterion, and precodes the uplink transmission using the precoder. It is noted that UE 510 may or may not transmit uplink DMRS or data. If uplink DMRS or data is transmitted, a QCL or SRI relationship between the SRS and DMRS or PUSCH may be needed.

Beam correspondence is a one-to-one association or relation between transmit beams of a first device and receive beams of a second device. The transmit beams and the receive beams should have the same (or substantially the same) beam pattern (in terms of peak or non-peak beam direction, peak or non-peak beam gain, beam gains measured as a cumulative distribution function (CDF) such as a 95-th percentile gain or a 50-th percentile gain and so forth, peak or non-peak beam width, and so on, for example) in the spatial domain. This means that for each beamformed beam, the beam response on all directions should be the same (or substantially the same) from the point of view of the first and second devices. This is known as the beam correspondence condition, and when the beam correspondence condition is met, beam correspondence is achieved. The beam correspondence can be across UL transmission and DL reception. The beam correspondence may be configured as a spatial QCL type or a spatial relation.

When beam correspondence holds at UE 510, 5G NR supports the transmission of information for a configured SRS resource, where the transmission of the SRS resource is performed with the same spatial filtering as the spatial filtering used for the reception of an indicated downlink RS. The association between a SRS resource set and the downlink RS resource may be configured by RRC signaling, for example. Therefore, when a SRS resource set is to be transmitted, either aperiodically, periodically, or semi-persistently, the associated downlink RS, as configured by RRC signaling, for example, is used for determining the spatial filtering of the SRS resource set. As another example, a SRS request field in a DCI is used to specify the association between the SRS resource set and the downlink RS resource, e.g., the DCI may include an ID of a NZP CSI-RS resource or resource set(s). The latest downlink RS transmission is to be used for deriving the uplink spatial filtering, so measurement restriction in time domain for the CSI-RS resource(s) or resource set(s) may be set as "OFF". Furthermore, an aperiodic downlink RS resource may be triggered by the SRS request field. That is, if the association between the CSI-RS and SRS are configured, and the CSI-RS and SRS are aperiodic, then when a SRS request is sent, the CSI-RS is also triggered and the UE first receives the CSI-RS, then the UE transmits the SRS with precoding derived from the CSI-RS associated with the SRS request. Upon reception of the SRS resource set by access node 505 and when access node 505 sends information about the transmit filter w to UE 510 (using a SRI, for example), then UE 510 uses the transmit filter w in the uplink.

Access node 505 receives the precoded uplink data transmission (block 573). Access node 505 uses a receive filter v, determined in BIT training 529, to receive the precoded uplink data transmission, for example. Access node 505 decodes the received uplink data transmission (block 575).

It is noted that the BIT-based data transmission may continue until the operating environment changes sufficiently so that BIT training 529 has to be repeated to obtain new v or w. As an example, BIT training 529 may be periodic. The periodicity of updating v and w is configured by the network. In this case BIT is viewed as tracking mechanism to track the environment changes without explicitly estimating the channel but rather updating the receive and transmit filters. As an example, if the error rate of the data transmissions begins to increase and eventually exceeds an error rate threshold, BIT training 529 may need to be repeated. As another example, if signal quality measurements drop below a signal quality threshold, BIT training 529 may need to be repeated. As yet another example, if a specified amount of time has elapsed since the last BIT training was performed, BIT training 529 may need to be repeated. As yet another example, access node 505 may receive an instruction to repeat BIT training 529.

In an embodiment, the UE (such as UE 510 sends an optional downlink channel quality report to the access node (such as access node 505). An example channel quality report may be a CSI report, which may include one of more of a rank indicator (RI), CQI, and precoding matrix indicator (PMI), CRI, Layer indication (L1), Layer 1 reference signal received power (Li-RSRP), etc. In an embodiment, the UE is configured with no CSI reporting associated with the BIT training iterations, i.e., for the CSI-ReportConfig associated with the downlink RS, the reportQuantity may be set to "none". This is because during the BIT training, downlink channel quality information is already embedded in the uplink transmission (e.g., sounding). Then no reporting is needed, except when BIT-based data transmission is to be performed, for which the UE may be configured with reportQuantity set as 'cri-RI-CQI' which is associated with CMRs and IMRs. In an embodiment, the UE is configured with non-PMI-PortIndication contained in a CSI-ReportConfig. This is because the downlink RS is already precoded. In the case where a PMI is sent, however, the access node may ignore the PMI and find the precoder instead of using the PMI to find the codebook. In another embodiment, the knowledge of the PMI and thus the codebook is used to assist the access node to find, derive, or update the precoder from the received signal and interference. Another example channel quality report may include RI and CQI. Yet another example channel quality report may include an internal UE specific parameter of the UE (such as a per-layer post-combining received SINR, per-layer CQI, etc.) and a combination of RI or CQI. It is noted that different feedback parameters of the channel quality report may have different reporting periodicities. In an embodiment, for every BIT training cycle (i.e., a complete iteration including access node precoded downlink transmission, UE receive combiner update, UE precoded uplink transmission, and access node transmit precoder update), the internal UE specific parameter is reported. In an embodiment, the internal UE specific parameter is fed back only when configured to do so. In an embodiment, CSI is not included in the channel quality report. In an embodiment, CQI is used for link adaptation prior to data transmission to help the access node determine the MCS level of the PDSCH and no PMI is fed back (i.e., reportQuantity set to 'cri-RI-CQI' and non-PMI-PortIndication contained in a CSI-ReportConfig).

In an embodiment, the access node requests the UE to provide the optional channel quality report. In an embodiment, after the access node receives the optional channel quality report from the UE, the access node trims (reduces) the rank of the transmission (based on the information in the channel quality report). As an example, if the information in the channel quality report indicates that the channel quality is low, the access node may reduce the rank of the transmission from four to two or one. In another embodiment, the access node receives the CQI report but rank reduction is not performed at the access node but the UE updates or trims the rank of transmission. The UE may inform the access node with the rank update by a separate feedback parameter such as a RI. In another embodiment, the access node receives a transmission configured with rank r, or reported by the UE as rank r, but a certain layer(s) is too weak to be accurately detected or decoded, and then the access node removes the corresponding layer(s) in subsequent DL transmissions for BIT training or data transmission. In another embodiment, the UE receives a transmission configured with rank r by the access node, but a certain layer(s) is too weak to be accurately detected or decoded, and then the UE removes the corresponding layer(s) in subsequent UL transmissions for BIT training, or data transmission, or CSI reporting. It is noted that for these embodiments, the transmission rank can only remain the same or be reduced, but not increased. In an embodiment, the access node may increase the rank of the transmission, based on the channel quality report or changes in the network load, traffic load, distribution, etc. A purpose of doing so is to reinitiate the BIT training process. This is because if the environment changes, a different and potentially higher rank may be more suitable for a UE. Therefore, the access node increases the rank to reinitiate the BIT training. The re-initiation may be done for only one or some UEs in a cell, with other UEs in this cell or other cells not increasing their ranks (although additional BIT iterations may be needed for all UEs or access nodes to achieve a new equilibrium), or all active UEs or cells in the network perform the re-initiation jointly.

Figure 7:
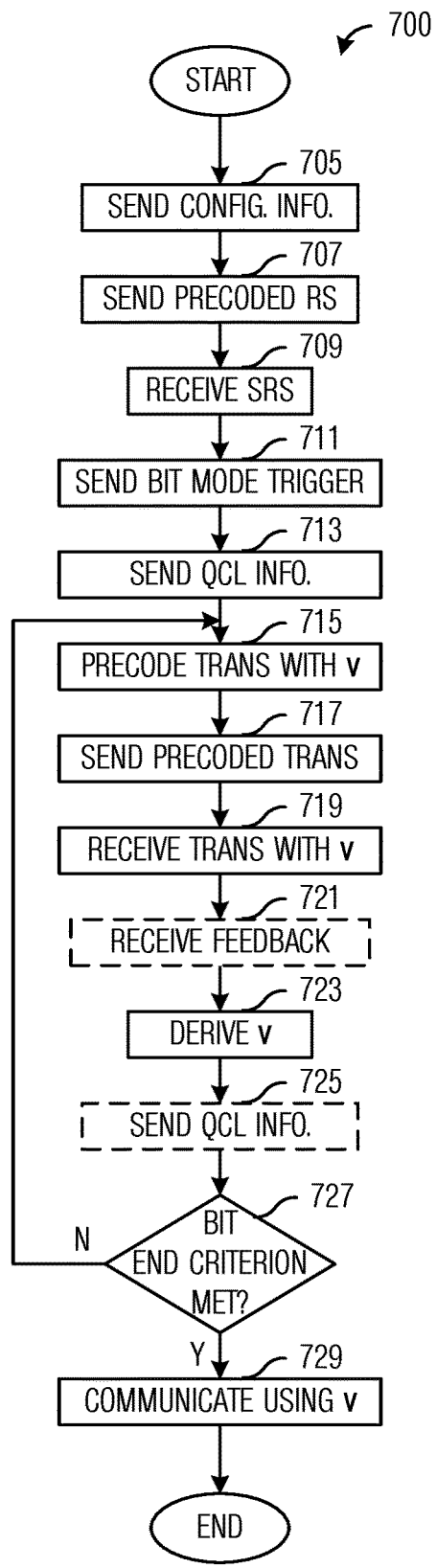
FIG. 7 illustrates a flow diagram of example operations occurring in an access node performing BIT-based communications according to example embodiments described herein.

FIG. 7 illustrates a flow diagram of example operations 700 occurring in an access node performing BIT-based communications. Operations 700 may be indicative of operations occurring in an access node as the access node performs BIT-based communications.

Operations 700 begin with the access node sending configuration information (block 705). The access node sends a precoded RS (block 707). The access node receives a SRS (block 709). The SRS may be beamformed or non-beamformed. The access node sends a BIT mode trigger (block 711). The BIT mode trigger starts the BIT training. In an embodiment, the BIT mode trigger is an implicit trigger. The access node may send QCL information (block 713) regarding the receiving relation between a signal and interference. The access node precodes a downlink RS with a transmit filter v (block 715) and sends the precoded downlink transmission (block 717). The precoded downlink transmission is transmitted on one or more resources associated with channel measurement (e.g., CMRs) or signal reception. The precoded downlink transmission includes a signal. The signal may be transmitted on one or more transmission ports, with each transmission port corresponding to a transmission layer. It is noted that a number of transmission layers corresponds to a rank of the precoded downlink transmission.

The access node receives a precoded uplink transmission (block 719). The precoded uplink transmission includes a signal that may be transmitted on one or more transmission ports, with each transmission port corresponding to a transmission layer. The number of transmission layers of the precoded uplink transmission may be equal to the number of transmission layers of the precoded downlink transmission. Additionally, there may be a one-to-one mapping between the one or more transmission ports of the precoded downlink transmission and the one or more transmission ports of the precoded uplink transmission. The precoded uplink transmission may be a SRS transmission or a DMRS transmission, for example. The access node may receive UE feedback (block 721). The UE feedback may be a channel quality report such as a CSI report. The access node derives its receive filter v in accordance with the received transmission (block 723). In other words, the access node derives, determines, or computes receive filter v to update the receive filter v. The access node may send QCL information (block 725). The access node performs a check to determine if an end criterion has been met (block 727). If the end criterion has not been met, the access node returns to block 715 to precode a downlink RS with the transmit filter v (which was updated in block 713) and repeats another iteration of BIT training. Transmit filter v and receive filter v may be equivalent filters. It is noted that in a deployment where the communications system supports multiple subbands or carriers, the transmit filter and the receive filter may be separately derived in each subband or carrier. Furthermore, the transmit filter may be a multi-antenna precoder, while the receive filter may be a multi-antenna combiner. The transmit filter and the receive filter may be either analog filters or digital filters. If the end criterion has been met, the access node may begin communications with the UE using the transmit filter and receive filter (block 729). In an embodiment, communications with the access node using the transmit filter and the receive filter may take place even before the end criterion has been met. As an example, the communications may begin after an initial iteration of BIT training, after a specified amount of time as elapsed after start of BIT training, or some performance threshold is met after start of BIT training, and so on.

FIG. 8A illustrates a flow diagram of example operations 800 occurring in a UE performing BIT-based communications. Operations 800 may be indicative of operations occurring in a UE as the UE performs BIT-based communications.

Operations 800 begin with the UE receiving configuration information (block 805). The UE receives a precoded RS (block 807). The UE sends a SRS (block 809). The SRS may be beamformed or non-beamformed or precoded or non-precoded. The SRS may be precoded using a transmit filter equivalent to a receive filter used to receive periodic CSI-RS or semi-persistent CSI-RS transmissions, or interference. The UE receives a BIT mode trigger (block 811). In an embodiment, the BIT mode trigger is an implicit trigger. The UE receives QCL information (block 813).

The UE receives a precoded downlink transmission with a receive filter w (block 815). The precoded downlink transmission is received on one or more resources associated with channel measurement (e.g., CMRs) or signal reception. The precoded downlink transmission includes a signal. The signal may be transmitted on one or more transmission ports, with each transmission port corresponding to a transmission layer. It is noted that a number of transmission layers corresponds to a rank of the precoded downlink transmission. The UE may also receive interference when it is receiving the precoded downlink transmission. The interference is received on one or more resources associated with interference transmission (e.g., IMRs). The resources associated with channel measurement or signal reception and interference transmission may be partially or completely overlapped. The UE derives its receive filter w in accordance with the received transmission and a QCL relationship between CMRs and IMRs (block 817). In other words, the UE derives, determines, or computes receive filter w to update the receive filter w. In the situation when the UE also receives interference, the UE derives its receive filter w in accordance with the received transmission, the received interference, and the QCL relationship between CMRs and IMRs. The UE precodes an uplink transmission with its transmit filter w (block 819) and sends the precoded uplink transmission (block 821). Transmit filter w and receive filter w may be equivalent filters. The precoded uplink transmission includes a signal that may be transmitted on one or more transmission ports, with each transmission port corresponding to a transmission layer. The number of transmission layers of the precoded uplink transmission may be equal to the number of transmission layers of the precoded downlink transmission. Additionally, there may be a one-to-one mapping between the one or more transmission ports of the precoded downlink transmission and the one or more transmission ports of the precoded uplink transmission. The precoded uplink transmission may be a SRS transmission or a DMRS transmission, for example. It is noted that in a deployment where the communications system supports multiple subbands or carriers, the transmit filter and the receive filter may be separately derived in each subband or carrier. Furthermore, the transmit filter may be a multi-antenna precoder, while the receive filter may be a multi-antenna combiner. The transmit filter and the receive filter may be either analog filters or digital filters. The UE may send feedback (block 823). The feedback may be a channel quality report, for example. As another example, the feedback sent by the UE may be based on the precoded downlink transmission and the interference. The UE may receive QCL information (block 825). The UE performs a check to determine if an end criterion has been met (block 827). If the end criterion has not been met, the UE returns to block 815 to receive a precoded downlink transmission with receive filter w (which was updated in block 817) and repeat another iteration of BIT training. If the end criterion has been met, the UE may begin communications with the access node using the transmit filter and the receive filter (block 829). In an embodiment, communications with the access node using the transmit filter and the receive filter may take place even before the end criterion has been met. As an example, the communications may begin after an initial iteration of BIT training, after a specified amount of time as elapsed after start of BIT training, or some performance threshold is met after start of BIT training, and so on.

FIG. 8B illustrates a flow diagram of example operations 850 occurring in a UE supporting BIT training. It is noted that multiple steps are described here, and each step may have multiple embodiments. Furthermore, the embodiments can be combined. Operations 850 begin with the UE receiving a first transmission in downlink (block 855). The first transmission in the downlink may be sent from one or more access nodes. The first transmission may include a first signal on one or more resources associated with signal reception that has been previously configured or indicated to the UE. The first signal may be sent from one or more access nodes serving the UE, and the first signal may include one or more layers. The first signal may be a RS, such as a NZP CSI-RS or DMRS for a downlink transmission, or a new or enhanced DL RS with one or multiple ports, each port corresponding to one transmission layer. The total number of ports or layers is informed to the UE via control signaling (such as CSI-RS configuration signaling or a MAC signaling or a DCI or joint from RRC signaling), MAC signaling, and DCI. The total number of ports or layers is the rank of the first signal. Associated with the first signal may be a first interference, that is, the first downlink transmission containing the first signal may be interfered by other transmissions. The interference may be seen on the resources associated with interference reception for the first transmission that has been previously configured or indicated to the UE, which may be the same as the resources associated with the signal reception or different. The association between the first signal and the interference may be configured by RRC signaling, activated by MAC signaling, indicated by DCI signaling, or by default if the interference reception resource(s) is the same as the signal reception resource(s). The first interference may be an aggregation of multiple other transmissions, including inter-cell and intra-cell interference intended for other UEs. Some part of the interference may be signaled with port information, and UE assumes each port corresponds to an interference transmission layer and takes into account the associated energy per resource element (EPRE) ratios configured or indicated to the UE. Other interference signals are not signaled with port information, and UE assumes these interference signals are present on all signaled interference resources, for example.

The UE derives a transmission precoder for uplink transmission (block 857). The derivation is based on UE assumptions specified for this procedure, which may be defined in a standard specification or associated with a signaling associated with the first downlink transmission. The UE assumptions include that the UE assumes a downlink transmission (e.g., a hypothetical PDSCH, or a PDSCH associated with the first transmission occurring at a later time that is known to the UE) of intended signal with rank equal to the first downlink signal, and interference corresponds to the first interference, and a receiver (may be a hypothetical receiver, a receiver assumed by the UE for deriving the UL precoding, a receiver to be used for receiving the associated PDSCH at a later time, or a receiver to be used for deriving CSI measurement for the associated PDSCH at a later time, for example) with a receive combiner equivalent to the uplink precoder. In other words, the uplink precoder reflects the downlink receive combiner (or vice versa), and hence, the uplink precoded transmission based on the precoder reflects the downlink signal or channel quality in the combined direction, interference condition in the combined direction, and UE capability of processing the signal and avoid, suppress, or cancel the interference if any. The uplink transmission then can carry the information to the access node so that the access node can adapt accordingly, such as link adaption of MCS, rank, or beamforming adaptation. The uplink rank is equal to the downlink rank, and the uplink layers and downlink layers have a one-to-one mapping. The power allocation of the uplink layers may not be uniform, such as associated with a post-combing downlink SINR for each downlink layer with the receive combiner.

The UE sends the uplink signal precoded with the precoder and associated power allocation (block 859). The uplink signal may be a SRS on a SRS resource or SRS resource set(s), or a DMRS. The UE may also send the post-combing downlink SINR for each downlink layer with the receive combiner. In some cases, the UE may also perform CSI measurement based on the first transmission and send CSI reporting information with the same receiver assumptions and CSI assumptions as the uplink signal, such as when specified by the access node and it may be used for link adaptation for the associated PDSCH at a later time. The UE procedure ends. However the access node may instruct the UE to perform the steps continuously or once in a while with a specified periodicity or based on an aperiodic signaling.

In BIT training and associated data transmission, a UE may be served by one or more access nodes. For the multiple access node case, each serving access node transmits one or more layers of RS or data to the UE, with different serving access nodes transmitting in a non-coherent joint transmission fashion. In an embodiment, BIT initiates with a UE served by multiple access nodes, but as the layer(s) associated a particular access node may be all trimmed (or reduced to zero), then the subsequent BIT training or data transmission does not involve the particular access node (unless a re-initiation is performed). However, the access node may remain as a serving cell for the UE, or it may be deconfigured or deactivated for the UE. Hence, the effective UE-cell association can be trained via BIT.

In above embodiments, it is generally described that aperiodic CSI-RS, aperiodic SRS, or aperiodic CSI reporting, etc., are used for BIT. However, any time domain behavior for the resources or reporting, such as periodic or semi-persistent CSI-RS, periodic or semi-persistent SRS, or periodic or semi-persistent CSI reporting may be used for any of the embodiments. The CSI request or SRS request can be then replaced by associated configuration signaling (such as RRC configuration signaling to configure periodic CSI reporting, or MAC activation signaling to activate a semi-persistent SRS, etc.).

In an embodiment, joint optimization of precoding and combining filters, transmission ranks and user association are considered to optimize network performance, with focus on weighted sum rate (WSR) maximization. Centralized algorithms often use the re-weighted $l_1$ method to relax the integer variables and constraints. Additionally, a fractional programming (FP) approach to solve the problem by iteratively optimizing precoders and combiners. The transmission ranks and user association are implicitly optimized during the iterations. The resulted iterative algorithm requires only local parameters for updating the variables. The resulting iterative algorithm differs by: maximizing a global WSR utility with a provable convergence; the power control and beamformer or combiner structure are jointly optimized; and transmission rank is also optimized.

A narrowband cellular network with L access nodes and K UEs is considered. The system works in TDD mode with channel reciprocity. Each UE can be cooperatively served by multiple access nodes, and the set of access nodes serving UE k is denoted as $\vec{s}_{q,j,i} \subset \{1, 2, \ldots, L\}$. Each access node can also serve multiple UEs, and the set of UEs served by access node l is denoted as $\mathcal{U}_l \subset \{1, 2, \ldots, K\}$. Furthermore, every access node is equipped with N antennas, and every UE is equipped with M antennas. For each access node or UE, all the antennas are used for transmission and receiving. The maximum transmission rank (number of independent data streams) supported by access node l is $Q_l \leq N$ and UE k can receive a maximum rank of $S_k \leq M$. The total rank from l-th access node to k-th UE is denoted as $D_{l,k}$. If multiple access nodes cooperatively serve a UE, the access nodes cooperate in a non-coherent way, which means that the access nodes send independent data streams and $\Sigma_{l \in B_k} D_{l,k} \leq S_k$. It is noted that the user association is implicitly determined by $\{D_{l,k}\}$, that is, $\mathcal{U}_l = \{k : D_{l,k} > 0\}$.

The downlink channel from access node l to UE k is denoted as $H_{l,k} \in \mathbb{C}^{M \times N}$, which is assumed to be unchanged within each coherence block and changes slowly over the time. It is also assumed that both the access nodes and UEs use linear precoding or combing. The beamforming vector of the d-th layer from access node l to UE k is denoted as $V_{d,l,k} \in \mathbb{C}^N$, and the corresponding combining vector at UE k is $W_{d,l,k} \in \mathbb{C}^M$. The downlink received signal at UE k is expressible as:

$$y_k = \Sigma_{l=1}^L H_{l,k}(\Sigma_{i \in u_l} \Sigma_{d=1}^{D_{l,i}} v_{d,l,i} s_{d,l,i}) + n_k \qquad (12)$$

where $s_{d,l,i}$ is the data symbol of the d-th layer from access node l to UE i with $\mathbb{E}[|s_{d,l,i}|^2] = 1$, and $n_k \sim \mathcal{CN}(0, \sigma_n^2 I_M)$ is the additive noise.

The UE k applies combiner $W_{d,l,k}$, and estimates the symbol $s_{d,l,k}$ as $\hat{s}k_{d,l,k} = W_{d,l,k}^H y_k$. The resulting received signal-to-interference ratio (SINR) is expressible as:

$$\gamma_{d,l,k} = \frac{|w_{d,l,k}^H H_{l,k} v_{d,l,k}|^2}{\sum_{(p,j,i)\neq(d,l,k)} |w_{d,l,k}^H H_{j,k} v_{p,j,i}|^2 + \sigma_n^2 \|w_{d,l,k}\|^2} \quad (13)$$

The problem of maximizing the downlink WSR is addressed by jointly optimizing the user association, transmission ranks, and beamforming or combing vectors (including power allocation). The problem is formulated as:

$$\mathcal{P}_0: \underset{\{w\},\{v\},\{D\geq 0\}}{\text{maximize}} \sum_{k=1}^{K} \sum_{l\in\mathcal{B}_k} \sum_{d=1}^{D_{l,k}} \alpha_k \log(1 + \gamma_{d,l,k}) \quad (14)$$

$$\text{subject to } \sum_{k\in\mathcal{U}_l} \sum_{d=1}^{D_{l,k}} \|v_{d,l,k}\|^2 \leq \rho, \forall l, \quad (15)$$

$$\sum_{l\in\mathcal{B}_k} D_{l,k} \leq S_k, \forall k,$$

$$\sum_{k\in\mathcal{U}_l} D_{l,k} \leq Q_l, \forall l$$

where $\alpha_k$ are the weights, and $\rho$ is the power budget at an access node. Constraints $\Sigma_{l\in\mathcal{B}_k} D_{l,k} \leq S_k$, $\forall k$ and $\Sigma_{k\in\mathcal{U}_l} D_{l,k} \leq Q_l$, $\forall l$ are the maximum rank constraint at an UE and an access node, respectively.

A centralized solution for problem $\mathcal{P}_0$ is provided. It is assumed that all the channels $H_{l,k}$ are known at a central controller where the problem is solved in a centralized way. The optimization problem as formulated above is a mixed integer non-linear programming (MINLP) problem, which is in general NP-hard. It is possible to approximate the problem with the re-weighted $l_1$ method and FP. The approximated problem is then solved with a coordinate block descent algorithm by iteratively updating the precoders and receivers.

Complexity is present in the integer rank variable $D_{l,k}$. It is possible to approximate it with convex functions. To begin with, assume that every UE can be served by any access node with arbitrary rank (no larger than $S_k$), so it is possible to define the sets of candidate beamforming or combing vectors $\{v_{d,l,k}\}$ and $\{w_{d,l,k}\}$ where $l\in\{1,\ldots,L\}$, $k\in\{1,\ldots,K\}$, and $d\in\{1,\ldots,S_k\}$. Then, replace the integer variables $\{D_{l,k}\}$ with $\{v_{d,l,k}\}$ or $\{w_{d,l,k}\}$ by observing that:

$$D_{l,k} = \Sigma_{d=1}^{S_k} \|v_{d,l,k}\|^2_0 = \Sigma_{d=1}^{S_k} \|w_{d,l,k}\|^2_0,$$

where the $l_0$ norm is defined as $\|x\|_0 = 1$ if $x>0$, and $\|x\|_0 = 0$ if $x=0$. Because the $l_0$ norm is still an integer constraint, further approximate the $l_0$ norm with the re-weighted $l_1$ method. Let x to denote either w or v, then:

$$\|\|x\|^2\|_0 \approx \frac{\|x\|^2}{\|\tilde{x}\|^2 + \varepsilon} \quad (16)$$

where x is the solution from previous iteration (later it is shown that the w and v are updated iteratively), and $\varepsilon$ is a small constant to avoid dividing by zero situation. Since $\|\|x\|^2\|_0$ is convex about x, the constraints $\Sigma_{l\in\mathcal{B}_k} D_{l,k} \leq S_k$, $\forall k$ and $\Sigma_{k\in\mathcal{U}_l} D_{l,k} \leq Q_l$, $\forall l$ are approximated with convex functions.

FP is used to rewrite the objective function. It is shown that the FP reformulation has the same optimal solutions $\{w^*\}$, $\{v^*\}$ as the original objective. For each summation term, a new variable $\beta_{d,l,k}$ is introduced, which is an indicator of downlink SINR. Each summation term is re-written as:

$$\log(1+\gamma_{d,l,k}) = \log(\beta_{d,l,k}) - \beta_{d,l,k} e_{d,l,k} \quad (17)$$

where $e_{d,l,k} = 1 - 2\text{Re}\{w_{d,l,k}^H H_{l,k} v_{d,l,k}\} + w_{d,l,k}^H C_k w_{d,l,k}$ is the downlink mean squared error and $C_k$ is the covariance matrix of received signals at UE k defined as:

$$C_k = \Sigma_{j=1}^{L} \Sigma_{i=1}^{K} \Sigma_{p=1}^{S_k} H_{j,k} v_{p,j,i} v_{p,j,i}^H H_{j,k}^H + \sigma_n^2 I \quad (18)$$

Hence, the problem $\mathcal{P}_0$ is approximated as:

$$\mathcal{P}_1: \underset{\{w\},\{v\},\{\beta\}}{\text{maximize}} \sum_{l=1}^{L} \sum_{k=1}^{K} \sum_{d=1}^{S_k} \alpha_k (\log(\beta_{d,l,k}) - \beta_{d,l,k} e_{d,l,k}) \quad (19)$$

$$\text{subject to } \sum_{k=1}^{K} \sum_{d=1}^{S_k} \|v_{d,l,k}\|^2 \leq \rho, \forall l,$$

$$\sum_{l=1}^{L} \sum_{d=1}^{S_k} \frac{\|v_{d,l,k}\|^2}{\|\tilde{w}_{d,l,k}\|^2 + \varepsilon} \leq S_k, \forall k,$$

$$\sum_{k=1}^{K} \sum_{d=1}^{S_k} \frac{\|v_{d,l,k}\|^2}{\|\tilde{v}_{d,l,k}\|^2 + \varepsilon} \leq Q_l, \forall l,$$

where $\{\tilde{w}\}$ and $\{\tilde{v}\}$ are the solutions from previous iteration.

There are three groups of variables in problem $\mathcal{P}_1$: $\{w\}$, $\{v\}$ and $\{\beta\}$. When any two groups of variables are fixed, $\mathcal{P}_1$ is concave over the remaining variables. This motivates using the Lagrangian multiplier method and coordinate block descent to solve the problem.

The Lagrangian function of $\mathcal{P}P_1$ is expressible as:

$$\mathcal{L}(\{w\},\{v\},\{\beta\},\{\mu\},\{\lambda\},\{\xi\}) \triangleq \left[\sum_{k=1}^{K} \alpha_k \sum_{l=1}^{L} \sum_{d=1}^{S_k} -\log(\beta_{d,l,k}) + \right. \quad (20)$$

$$\beta_{d,l,k}(1 - 2\text{Re}\{w_{d,l,k}^H H_{l,k} v_{d,l,k}\} + w_{d,l,k}^H C_k w_{d,l,k})\right] +$$

$$\sum_{l=1}^{L} \mu_l \left(\sum_{k=1}^{K} \sum_{d=1}^{S_k} \|v_{d,l,k}\|^2 - \rho\right) +$$

$$\sum_{k=1}^{K} \lambda_k \left(\sum_{l=1}^{L} \sum_{d=1}^{S_k} \frac{\|w_{d,l,k}\|^2}{\|\tilde{w}_{d,l,k}\|^2 + \varepsilon} - S_k\right) +$$

$$\sum_{l=1}^{L} \xi_l \left(\sum_{k=1}^{K} \sum_{d=1}^{S_k} \frac{\|v_{d,l,k}\|^2}{\|\tilde{v}_{d,l,k}\|^2 + \varepsilon} - Q_l\right),$$

where $\mu_l \geq 0$, $\lambda_k \geq 0$, and $\xi_l \geq 0$ are the dual variables associated with constraints $$\sum_{k=1}^{K} \sum_{d=1}^{S_k} \|v_{d,l,k}\|^2 \leq \rho, \forall l, \sum_{l=1}^{L} \sum_{d=1}^{S_k} \frac{\|w_{d,l,k}\|^2}{\|\tilde{w}_{d,l,k}\|^2 + \varepsilon} \leq S_k,$$

$$\forall k, \text{ and } \sum_{k=1}^{K} \sum_{d=1}^{S_k} \frac{\|v_{d,l,k}\|^2}{\|\tilde{v}_{d,l,k}\|^2 + \varepsilon} \leq Q_l, \forall l, \text{ respectively.}$$

The first order optimality requires that:

$$\begin{cases} \nabla_{w_{d,l,k}} \mathcal{L} = 0, & \forall d, l, k \\ \nabla_{v_{d,l,k}} \mathcal{L} = 0, & \forall d, l, k \\ \frac{\partial \mathcal{L}}{\partial \beta_{d,l,k}} = 0, & \forall d, l, k \end{cases} \quad (21)$$

which leads to the following updating rules:

$$w_{d,l,k} = \left(C_k + \frac{\lambda_k/(\alpha_k \beta_{d,l,k})}{\|\tilde{w}_{d,l,k}\|^2 + \varepsilon} I\right)^{-1} H_{l,k} v_{d,l,k} \quad (22)$$

-continued $$\beta_{d,l,k} = (1 - 2\text{Re}\{w_{d,l,k}^H H_{l,k} v_{d,l,k}\} + w_{d,l,k}^H C_k w_{d,l,k})^{-1} \quad (23)$$

and:

$$v_{d,l,k} = \left(A_k + \mu_l I + \frac{\xi_l I}{\|\tilde{v}_{d,l,k}\|^2 + \varepsilon}\right)^{-1} \alpha_k H_{l,k}^H w_{d,l,k} \beta_{d,l,k} \quad (24)$$

where:

$$A_k = \sum_{i=1}^{K} \sum_{j=1}^{L} \sum_{p=1}^{S_k} \alpha_k H_{l,i}^H w_{p,j,i} \beta_{p,j,i} w_{p,j,i}^H H_{l,i}.$$

Because the norms $\|w_{d,l,k}\|^2$ and $\|v_{d,l,k}\|^2$ are monotonic functions about dual variables, the optimal value of dual variables can be found using bi-sectional search to satisfy complementary slackness.

The complete description of the centralized algorithm is presented in Algorithm 1. Starting from the initialization solutions, the receivers w, SINR indicator {β}, and precoders v are updated iteratively.

---
Algorithm 1: Centralized Solution
---
Input: global channels $H_{l,k}$, ∀l, k, power budgets ρ, max ranks $S_k$, ∀k and $Q_l$, ∀l.
Initialization: let $\beta_{d,l,k}$ = 1, ∀d, l, k and randomly initialize precoders $\tilde{v}_{d,l,k}$ and let $v_{d,l,k} = \tilde{v}_{d,l,k}$, ∀d, l, k.
While: weighted sum rate not converged Do
    Update $w_{d,l,k}$ according to $w_{d,l,k}$, ∀d, l, k.
    Update $\beta_{d,l,k}$ according to $\beta_{d,l,k}$, ∀d, l, k.
    Update $v_{d,l,k}$ according to $v_{d,l,k}$, ∀d, l, k.
    Set $\tilde{v}_{d,l,k} = v_{d,l,k}$, $\tilde{w}_{d,l,k} = w_{d,l,k}$, ∀d, l, k.
End while
Calculate $D_{l,k}$ (e.g., according to
$\Sigma_{d=1}^{S_k} \|\|v_{d,l,k}\|^2\|_0 = \Sigma_{d=1}^{S_k} \|\|w_{d,l,k}\|^2\|_0$)
Return $w_{d,l,k}$, $v_{d,l,k}$, and $D_{l,k}$.

---

An observation from these updating rules is that only local training and channel information is required. Specific, each UE k only needs to covariance $C_k$ and effective channel $H_{l,k} v_{d,l,k}$ from serving access nodes to update the receivers. No information of other UEs are needed. Similarly, each access node only requires channel information of serving UEs to design the precoders. This motivates the design of a distributed solution based on bi-directional training, where these informations are estimated directly from training signals.

In an embodiment, a distributed solution based on BIT is provided. Blocks of training signals are transmitted repeatedly in downlink and uplink directions. In downlink signaling, the UEs estimate the downlink combiners. Then the UEs use the estimated combiners as beamformers and send uplink signals. The access nodes estimate the uplink combiners and use those as downlink precoders for next round of training. Without explicitly estimating the channel, the precoders and combiners are adapted directly through training. The BIT solution is fully distributed and the computational complexity does not increase with network size.

In downlink training, all access nodes simultaneously send T downlink training signals. At the receiver side, it observes signal:

$$Y_k = \sum_{i=1}^{K} \sum_{j=1}^{L} \sum_{p=1}^{S_i} H_{j,k} v_{p,j,i} s_{p,j,i} + N_k \quad (25)$$

where $Y_k \in \mathbb{C}^{M \times T}$ are received signals and $s_{p,j,i} = [s_{p,j,i}[1], \ldots, s_{p,j,i}[T]] \in \mathbb{C}^{1 \times T}$ are the training signals.

To determine the combiner, the receiver should know the signal covariance matrix $C_k$ as well as effective direct channel $g_{d,l,k} \triangleq H_{l,k} v_{d,l,k}$. It is proposed that the covariance matrix be estimated as $$\hat{C}_k = \frac{1}{T} Y_k Y_k^H$$

and the effective direct channel as $$\hat{g}_{d,l,k} = \frac{1}{T} Y_k s_{d,l,k}^H.$$

This leads to the following updating rule for downlink receivers (a convention followed here is that with the superscript (t−1), the quantity is the value from the previous iteration; otherwise the quantity is the value obtained in this iteration):

$$\hat{w}_{d,l,k} = \left(\hat{C}_k + \frac{\lambda_k}{\beta_{d,l,k}^{(t-1)} \|w_{d,l,k}^{(t-1)}\|^2 + \varepsilon} I\right)^{-1} \hat{g}_{d,l,k} \quad (26)$$

It is noted at because the dual variable $\lambda_k$ and the weight $\alpha_k$ in $w_{d,l,k}$ are fully coupled, and $\lambda_k$ is the dual variable to be determined, and is possible to incorporate $\alpha_k$ into $\lambda_k$. Similarly, with the estimated covariance matrix and effective channel, the updating rule for β may be expressible as:

$$\hat{\beta}_{d,l,k} = (1 - 2\text{Re}\{\hat{w}_{d,l,k}^H \hat{g}_{d,l,k}\} + \hat{w}_{d,l,k}^H \hat{C}_k \hat{w}_{d,l,k})^{-1} \quad (27)$$

In uplink training, each UE sends a sequence of training signals. A goal is to let the access nodes determine the precoders {v} as in $$v_{d,l,k} = \left(A_k + \mu_l I + \frac{\xi_l I}{\|\tilde{v}_{d,l,k}\|^2 + \varepsilon}\right)^{-1} \alpha_k H_{l,k}^H w_{d,l,k} \beta_{d,l,k}.$$

With channel reciprocity, the uplink received training signal at access node l is expressible as:

$$R_l = \sum_{i=1}^{K} \sum_{j \in \mathcal{B}_i} \sum_{p=1}^{S_i} H_{l,i}^H f_{p,j,i} x_{p,j,i} + \tilde{N}_l \quad (28)$$

where $R_l \in \mathbb{C}^{N \times T}$ are the received signals, $f_{p,j,i} \in \mathbb{C}^M$ are the uplink precoder of the p-th stream at UE i, $x_{p,j,i} \in \mathbb{C}^{1 \times T}$ are the uplink training signals, and $\tilde{N}_l$ are the additive noise.

Using BIT, the uplink precoder is a scaled version of downlink receiver and is expressible as:

$$f_{d,l,k} = \sqrt{\theta_k} \hat{w}_{d,l,k} \sqrt{\alpha_k \hat{\beta}_{d,l,k}} \quad (29)$$

where $$\theta_k = \min(1, \tilde{\rho} / \Sigma_{l \in \mathcal{B}_k} \Sigma_{d=1}^{S_k} \|w_{d,l,k} \sqrt{\alpha_k \hat{\beta}_{d,l,k}}\|^2),$$

and $\tilde{\rho}$ is the power budget at each UE. $\theta_k$ is used to enforce the power constraint $\Sigma_{j \in \mathcal{B}_i} \Sigma_{p=1}^{S_i} \|f_{p,j,i}\|^2 \leq \tilde{\rho}$.

Because the power control variable $\theta_k$ and fairness control variable $\alpha_k$ are fully coupled in $$v_{d,l,k} = \left(A_k + \mu_l I + \frac{\xi_l I}{\|\tilde{v}_{d,l,k}\|^2 + \varepsilon}\right)^{-1} \alpha_k H_{l,k}^H w_{d,l,k} \beta_{d,l,k},$$

it is possible to define a new fairness control variable as $\tilde{\alpha}_k \triangleq \theta_k \alpha_k$. In fact, uplink power control effectively acts as fairness control, where UEs with high data rates are assigned lower weights. With received signal $R_l$, access node l first estimates the uplink signal covariance matrix as $$\hat{A}_l = \frac{1}{T} R_l R_l^H - \sigma_n^2 I,$$

where the noise is subtracted to make it consistent with the definition of $A_k$. Similarly, an uplink effective channel is defined as $b_{d,l,k} \triangleq \tilde{a}_k H_{l,k}{}^H w_{d,l,k} \beta_{d,l,k}$, and estimated as:

$$\hat{b}_{d,l,k} = \frac{1}{T} Y_l s_{d,l,k}^H \sqrt{\tilde{\alpha}_k \hat{\beta}_{d,l,k}^{BS}}, \quad (30)$$

where $\tilde{\beta}_{d,l,k}{}^{BS}$ is the estimated downlink SINR indicator at the access node.

One way of obtaining $\tilde{\beta}_{d,l,k}{}^{BS}$ is through UE feedback, but this could result in large feedback overhead. Instead, it is proposed to directly estimate it at the access node. Observe that if $$\lambda_k = 0 \text{ in } w_{d,l,k} = \left(C_k + \frac{\lambda_k/(\alpha_k \beta_{d,l,k})}{\|\tilde{w}_{d,l,k}\|^2 + \varepsilon} I\right)^{-1} H_{l,k} v_{d,l,k},$$

then:

$$\hat{\beta}_{d,l,k} = \left(1 - \hat{w}_{d,l,k}^H H_{l,k} v_{d,l,k}\right)^{-1} = \frac{1}{1 - z_{d,l,k}^H v_{d,l,k}} \quad (31)$$

where an auxiliary variable is defined as $$z_{d,l,k} \triangleq H_{l,k}^H \hat{w}_{d,l,k} = H_{l,k}^H f_{d,l,k}/\sqrt{\tilde{\alpha}_k \hat{\beta}_{d,l,k}} \quad (32)$$

which can be estimated through uplink received signals as:

$$\hat{z}_{d,l,k} = \frac{Y_l s_{d,l,k}^H}{T \sqrt{\tilde{\alpha}_k \hat{\beta}_{d,l,k}}} \quad (33)$$

Because $v_{d,l,k}$ is known at the access node, a quadratic equation for $\hat{\beta}_{d,l,k}$ is solved by by combining equation $$\hat{\beta}_{d,l,k} = \left(1 - \hat{w}_{d,l,k}^H H_{l,k} v_{d,l,k}\right)^{-1} = \frac{1}{1 - z_{d,l,k}^H v_{d,l,k}}, \text{ and}$$

$$\hat{z}_{d,l,k} = \frac{Y_l s_{d,l,k}^H}{T \sqrt{\tilde{\alpha}_k \hat{\beta}_{d,l,k}}}.$$

So, the estimated $\beta_{d,l,k}{}^{BS}$ is expressible as:

$$\sqrt{\hat{\beta}_{d,l,k}^{BS}} = \frac{a_{d,l,k}^* + \sqrt{|a_{d,l,k}|^2 + 4}}{2}$$

(34) where $\alpha_{d,l,k} = v_{d,l,k}^H Y_l s_{d,l,k}^H / \sqrt{\tilde{\alpha}_k} T$. Therefore, the updating rule for precoders at BS is expressible as:

$$\hat{v}_{d,l,k} = \left(\hat{A}_l + \mu_l I + \frac{\xi_l I}{\|v_{d,l,k}^{(t-1)}\|^2 + \varepsilon}\right)^{-1} \hat{b}_{d,l,k} \quad (35)$$

The overall distributed algorithm is shown in Algorithm 2. The initial precoders $\{v_{d,l,k}\}$ can be randomly initialized. During the training, each UE only need to feedback a single parameter $\tilde{\alpha}_k$ to its serving BS, which can be coarsely quantized into several bits.

---

Algorithm 2: BIT solution
Initialization: initialize $\{v_{d,l,k}\}, \forall\ d,l,k$.
  Downlink Signaling: BSs send downlink training signals.

UEs update $w_{d,l,k}$ according to $\hat{w}_{d,l,k} = \left(\hat{C}_k + \frac{(\lambda_k)}{(\beta_{d,l,k}^{(t-1)} \|w_{d,l,k}^{(t-1)}\|^2 + \varepsilon)} I\right)^{-1} \hat{g}_{d,l,k}, \forall\ d, l, k$.

UEs update $\beta_{d,l,k}$ according to $\hat{\beta}_{d,l,k} = (1 - 2\text{Re}\{\hat{w}_{d,l,k}^H \hat{g}_{d,l,k}\} + \hat{w}_{d,l,k}^H \hat{C}_k \hat{w}_{d,l,k})^{-1}, \forall d,l,k$.

UEs set uplink precoders as $f_{d,l,k} = \sqrt{\theta_k}\ \hat{w}_{d,l,k} \sqrt{\alpha_k \hat{\beta}_{d,l,k}}$.

Uplink Signaling: UEs send uplink training signals.

BSs update $\beta_{d,l,k}^{BS}$ according to $\sqrt{\hat{\beta}_{d,l,k}^{BS}} = \frac{a_{d,l,k}^* + \sqrt{|a_{d,l,k}|^2 + 4}}{2}, \forall\ d, l, k$.

BSs update $v_{d,l,k}$ according to $\hat{v}_{d,l,k} = \left(\hat{A}_l + \mu_l I + \frac{\xi_l I}{\|v_{d,l,k}^{(t-1)}\|^2 + \varepsilon}\right)^{-1} \hat{b}_{d,l,k}, \forall\ d, l, k$.

Repeat within the training period.

---

Figure 9:
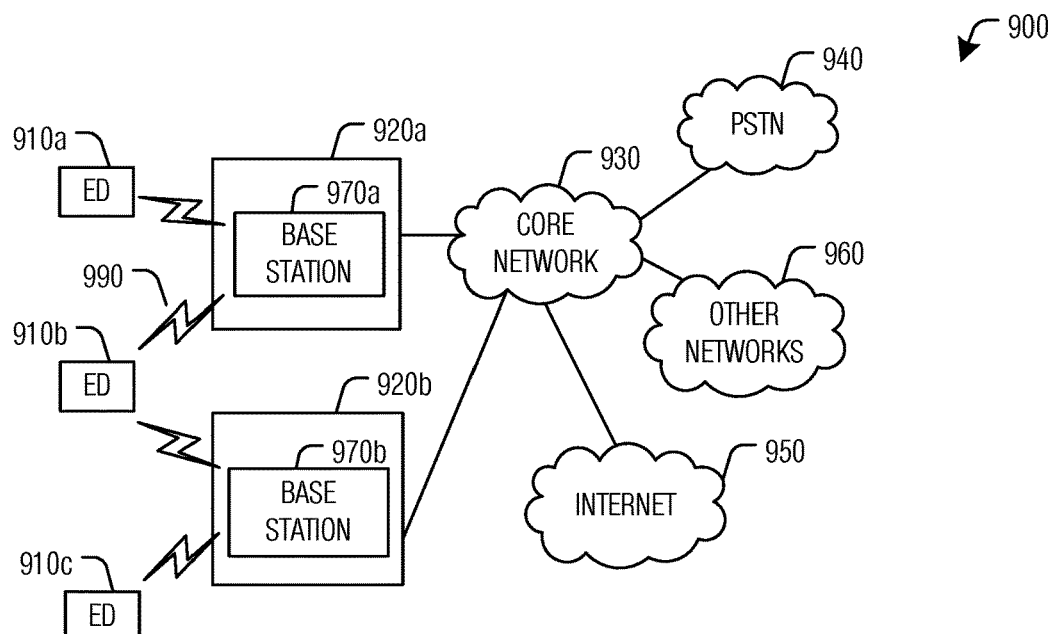
FIG. 9 illustrates an example communication system according to example embodiments described herein.

FIG. 9 illustrates an example communication system 900. In general, the system 900 enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910a-910c, radio access networks (RANs) 920a-920b, a core network 930, a public switched telephone network (PSTN) 940, the Internet 950, and other networks 960. While certain numbers of these components or elements are shown in FIG. 9, any number of these components or elements may be included in the system 900.

The EDs 910a-910c are configured to operate or communicate in the system 900. For example, the EDs 910a-910c are configured to transmit or receive via wireless or wired communication channels. Each ED 910a-910c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 920a-920b here include base stations 970a-970b, respectively. Each base station 970a-970b is configured to wirelessly interface with one or more of the EDs 910a-910c to enable access to the core network 930, the PSTN 940, the Internet 950, or the other networks 960. For example, the base stations 970a-970b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 910a-910c are configured to interface and communicate with the Internet 950 and may access the core network 930, the PSTN 940, or the other networks 960.

In the embodiment shown in FIG. 9, the base station 970a forms part of the RAN 920a, which may include other base stations, elements, or devices. Also, the base station 970b forms part of the RAN 920b, which may include other base stations, elements, or devices. Each base station 970a-970b operates to transmit or receive wireless signals within a particular geographic region or area, sometimes referred to as a "cell." In some embodiments, multiple-input multiple-output (MIMO) technology may be employed having multiple transceivers for each cell.

The base stations 970a-970b communicate with one or more of the EDs 910a-910c over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 920a-920b are in communication with the core network 930 to provide the EDs 910a-910c with voice, data, application, Voice over Internet Protocol (VoIP), or other services. Understandably, the RANs 920a-920b or the core network 930 may be in direct or indirect communication with one or more other RANs (not shown). The core network 930 may also serve as a gateway access for other networks (such as the PSTN 940 the Internet 950, and the other networks 960). In addition, some or all of the EDs 910a-910c may include functionality for communicating with different wireless networks over different wireless links using different wireless technologies or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system 900 could include any number of EDs, base stations, networks, or other components in any suitable configuration.

Figure 10A:
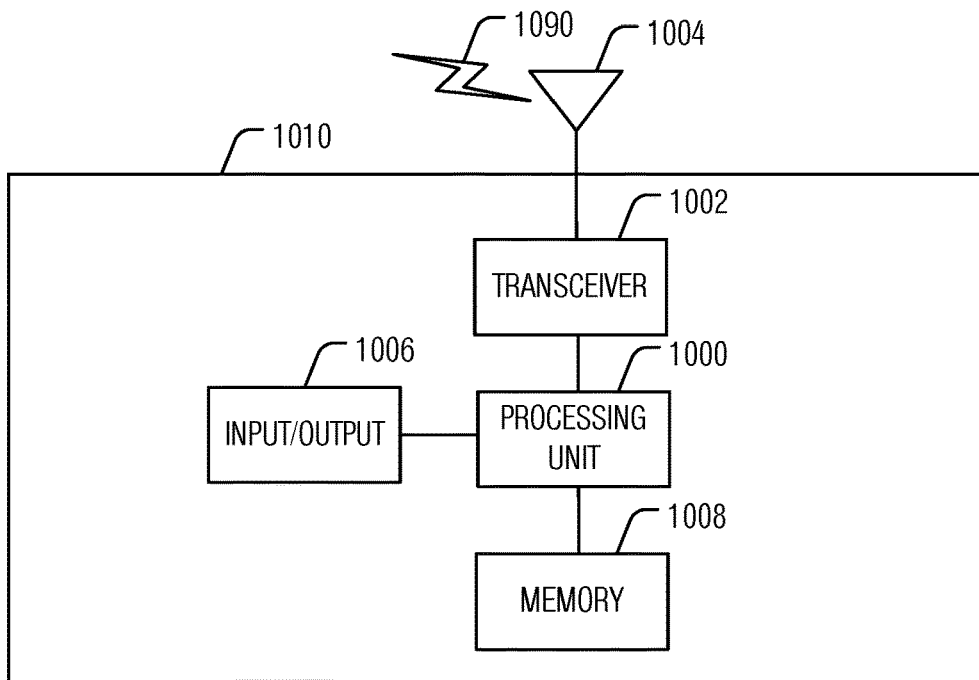
FIGS. 10A and 10B illustrate example devices that may implement the methods and teachings according to this disclosure.
Figure 10B:
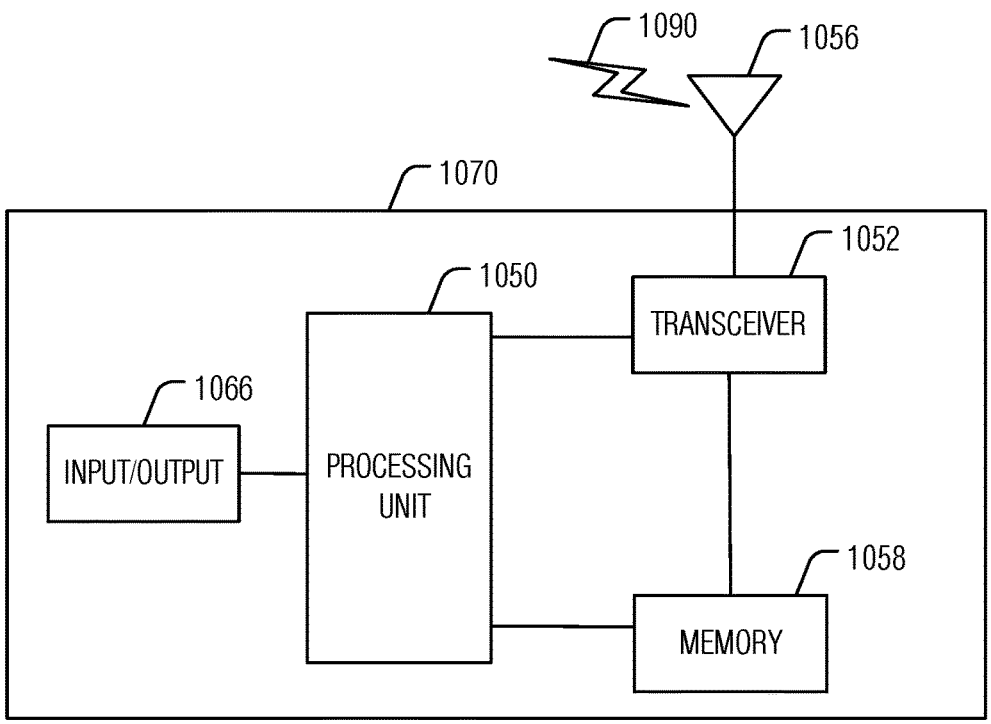

FIGS. 10A and 10B illustrate example devices that may implement the methods and teachings according to this disclosure. In particular, FIG. 10A illustrates an example ED low, and FIG. 10B illustrates an example base station 1070. These components could be used in the system 900 or in any other suitable system.

As shown in FIG. 10A, the ED low includes at least one processing unit moo. The processing unit moo implements various processing operations of the ED low. For example, the processing unit moo could perform signal coding, data processing, power control, input/output processing, or any other functionality enabling the ED low to operate in the system 900. The processing unit moo also supports the methods and teachings described in more detail above. Each processing unit moo includes any suitable processing or computing device configured to perform one or more operations. Each processing unit moo could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission or processing signals received wirelessly or by wire. Each antenna 1004 includes any suitable structure for transmitting or receiving wireless or wired signals. One or multiple transceivers 1002 could be used in the ED 1010, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) woo and data used to reduce or eliminate interference in incoming signals. Each memory 1008 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1000 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile or non-volatile storage and retrieval device(s). Each input/output device 1066 facilitates interaction with a user or other devices (network communications) in the network. Each input/output device 1066 includes any suitable structure for providing information to or receiving/providing information from a user, including network interface communications.

Figure 11:
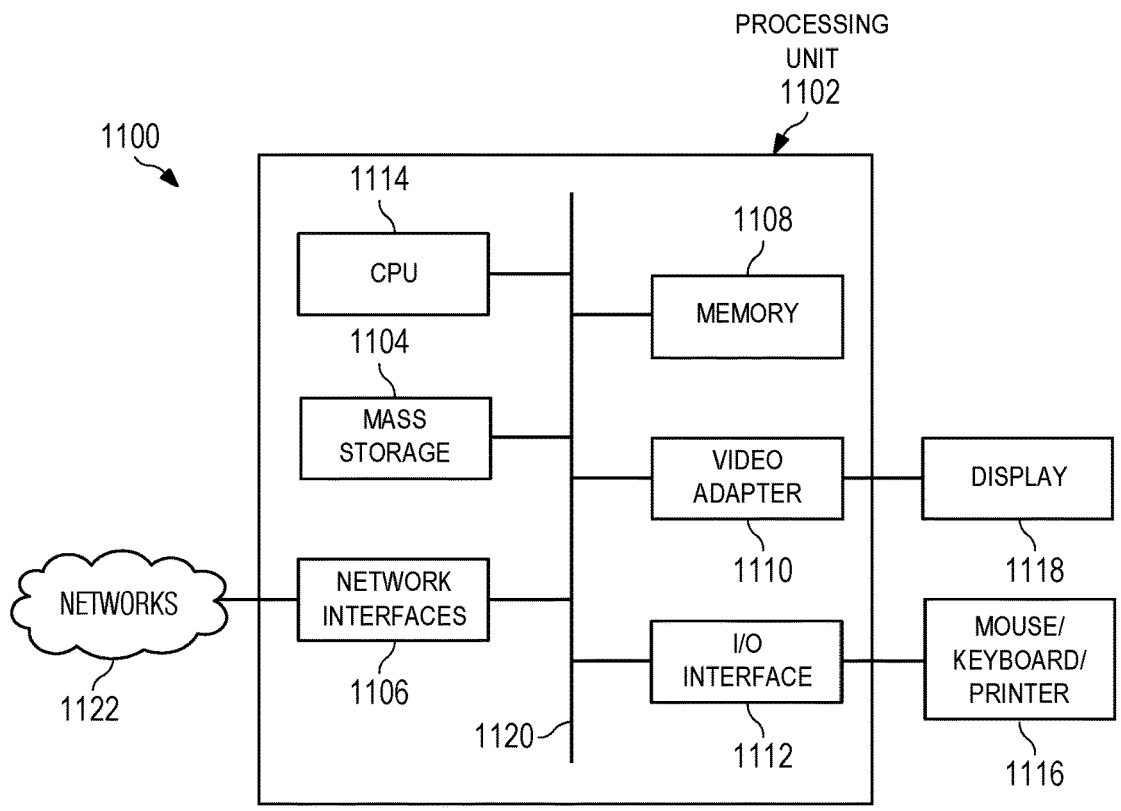
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system moo includes a processing unit 1102. The processing unit includes a central processing unit (CPU) 1114, memory 1108, and may further include a mass storage device 1104, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 1118 coupled to the video adapter 1110 and a mouse, keyboard, or printer 1116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a deriving unit or module, an updating unit or module, a precoding unit or module, a determining unit or module, or a repeating unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A computer implemented method for operating a communications device, the method comprising:
receiving, by the communications device from one or more access nodes, a first transmission including a first signal on one or more resources associated with signal reception;
deriving, by the communications device, a receive filter in accordance with the received first transmission;
deriving, by the communications device, a transmit filter in accordance with the receive filter;
precoding, by the communications device, a second signal with the transmit filter, thereby producing a second transmission; and
transmitting, by the communications device to the one or more access nodes, the second transmission on a plurality of second transmission ports, the second transmission having a same number of transmission ports as the first transmission and in a one-to-one mapping.

2. The method of claim 1, wherein each first transmission port corresponds to a transmission layer, and a number of transmission layers of the first transmission corresponds to a first transmission rank.

3. The method of claim 2, wherein the transmit filter is a weighted version of the receive filter weighted by weights associated with each of the transmission layers.

4. The method of claim 1, wherein the resources associated with signal reception comprise at least one of non-zero-power (NZP) channel state information reference signal (CSI-RS) resources configured for channel and interference measurement, NZP CSI-RS resources configured for channel measurement, demodulation reference signal (DMRS) resources, or physical downlink shared channel (PDSCH) resources.

5. The method of claim 1, wherein the communications device further receives interference on resources associated with interference transmission, and wherein deriving the receive filter further comprising deriving, by the communications device, the receive filter in accordance with the received first transmission and the received interference.

6. The method of claim 5, wherein the resources associated with interference transmission comprise at least one of NZP CSI-RS resources configured for channel and interference measurement, NZP CSI-RS resources configured for channel measurement, NZP CSI-RS resources configured for interference measurement, zero-power (ZP) CSI-RS resources configured for interference measurement, CSI interference measurement resources, DMRS resources, or PDSCH resources.

7. The method of claim 5, wherein the communications device derives the receive filter in accordance with the received first transmission and the received interference on resources associated with signal reception and interference transmission that are partially overlapped or completely overlapped.

8. The method of claim 5, further comprising sending, by the communications device to the one or more access nodes, feedback information based on the received first transmission and the received interference.

9. The method of claim 1, further comprising repeating, by the communications device, the receiving, the deriving the receive filter, the deriving the transmit filter, the precoding, and the transmitting until an end criterion is met.

10. The method of claim 9, wherein the end criterion comprises at least one of a signal plus interference to noise ratio (SINR) meeting a threshold, or the communications device receiving an instruction to stop training.

11. The method of claim 1, wherein the second transmission is one of a sounding reference signal (SRS) transmission or a DMRS transmission.

12. The method of claim 1, wherein the transmit filter and the receive filter are equivalent.

13. The method of claim 12, wherein the transmit filter and the receive filter are at least one of conjugate transposed versions of each other, conjugated versions of each other, scaled versions of each other, normalized versions of each other, or are identical to each other.

14. The method of claim 1, wherein the receive filter is derived in accordance with a minimum mean square error (MMSE) combiner.

15. The method of claim 1, further comprising sending, by the communications device to the one or more access nodes prior to receiving the first transmission, a precoded SRS or a non-precoded SRS.

16. The method of claim 15, wherein the communications device transmits the SRS with the same filter used for a reception of a periodic CSI-RS or a semi-persistent CSI-RS, and for a reception of interference.

17. The method of claim 1, wherein the first and second transmissions occur over one or more subbands, and wherein the receive filter and the transmit filter are separately derived for each subband.

18. The method of claim 1, wherein the transmit filter comprises a multi-antenna precoder, and wherein the receive filter comprises a multi-antenna combiner.

19. A computer implemented method for operating an access node in a training mode, the method comprising:
   precoding, by the access node, a first signal with a transmit filter, thereby producing a first transmission;
   transmitting, by the access node to a communications device, the first transmission on a plurality of first transmission ports;
   receiving, by the access node from the communications device, a second transmission including a second signal, the second signal being received on resources associated with signal reception, the second including a same number of transmission ports as the first transmission and in a one-to-one mapping;
   deriving, by the access node, a receive filter in accordance with the received second transmission; and
   deriving, by the access node, the transmit filter in accordance with the receive filter.

20. The method of claim 19, further comprising repeating, by the access node, the precoding, the transmitting, the receiving, the deriving the receive filter, and the deriving the transmit filter until an end criterion is met.

21. The method of claim 20, wherein the end criterion comprises a signal plus interference to noise ratio (SINR) meeting a threshold.

22. The method of claim 19, further comprising receiving, by the access node from the communications device, feedback information, and wherein deriving the receive filter is in accordance with the feedback information.

23. The method of claim 19, wherein the method further comprises:
   reducing, by the access node, a first transmission rank when in response to a SINR of at least one transmission layer of the second transmission being below a threshold; and
   signaling, by the access node to the communications device, the reduced first transmission rank.

24. The method of claim 19, further comprising sending, by the access node to the communications device, an instruction to stop operating in the training mode.

25. The method of claim 19, wherein deriving the receive filter comprises adjusting the receive filter to maximize a signal plus interference noise ratio (SINR) of a communications system including the communications device and the access node.

26. The method of claim 19, further comprising receiving, by the access node from the communications device prior to precoding the first signal, a sounding reference signal (SRS) or a non-precoded SRS.

27. The method of claim 26, wherein the transmit filter is selected in accordance with the SRS or the non-precoded SRS.

28. The method of claim 19, further comprising, prior to precoding the first signal, sending, by the access node to the communications device, a trigger initiating operating in the training mode.

29. A communications device comprising:
   a memory storage comprising instructions; and
   one or more processors in communication with the memory storage, wherein the one or more processors execute the instructions to:

receive, from one or more access nodes, a first transmission including a first signal on one or more resources associated with signal reception;

derive a receive filter in accordance with the received first transmission, derive a transmit filter in accordance with the receive filter, precode a second signal with the transmit filter, thereby producing a second transmission, and transmit, to the one or more access nodes, the second transmission on a plurality of second transmission ports, the second transmission having a same number of transmission ports as the first transmission and in a one-to-one mapping.

30. The communications device of claim 29, wherein interference is received on resources associated with interference transmission, and wherein the one or more processors further execute the instructions to derive the receive filter in accordance with the received first transmission and the received interference.

31. The communications device of claim 30, wherein the one or more processors further execute the instructions to send, to the one or more access nodes, feedback information based on the received first transmission and the received interference.

32. The communications device of claim 29, wherein the one or more processors further execute the instructions to repeat receiving the first transmission, deriving the receive filter, deriving the transmit filter, precoding the second signal, and transmitting the second transmission until an end criterion is met.

33. The communications device of claim 29, wherein the one or more processors further execute the instructions to send, to the one or more access nodes prior to receiving the first transmission, a precoded sounding reference signal (SRS) or a non-precoded SRS.

34. An access node comprising:
a memory storage comprising instructions; and
one or more processors in communication with the memory storage, wherein the one or more processors execute the instructions to:
precode a first signal with a transmit filter, thereby producing a first transmission;
transmit, to a communications device, the first transmission on a plurality of first transmission ports,
receive, from the communications device, a second transmission including a second signal, the second signal being received on resources associated with signal reception, wherein the second transmission includes a same number of transmission ports as the first transmission and in a one-to-one mapping,
derive a receive filter in accordance with the received second transmission, and
derive the transmit filter in accordance with the receive filter.

35. The access node of claim 34, wherein the one or more processors further execute the instructions to repeat precoding the first signal, transmitting the first transmission, receiving the second transmission, deriving the receive filter, and deriving the transmit filter until an end criterion is met.

36. The access node of claim 34, wherein the one or more processors further execute the instructions to receive, from the communications device, feedback information, and wherein the receive filter is derived in accordance with the feedback information.

37. The access node of claim 34, wherein the one or more processors further execute the instructions to reduce a first transmission rank in response to a signal plus interference to noise ratio (SINR) of at least one transmission layer of the second transmission being below a threshold, and signal, to the communications device, the reduced first transmission rank.

38. The access node of claim 34, wherein the one or more processors further execute the instructions to send, to the communications device, an instruction to stop operating in a training mode.

39. The access node of claim 34, wherein the one or more processors further execute the instructions to receive, from the communications device prior to precoding the first signal, a sounding reference signal (SRS) or a non-precoded SRS.

40. The access node of claim 34, wherein the one or more processors further execute the instructions to send, to the communications device prior to precoding the first signal, a trigger initiating operating in a training mode.

* * * * *

UNITED STATES PATENT AND TRADEMARK OFFICE
CERTIFICATE OF CORRECTION

PATENT NO. : 10,651,900 B2
APPLICATION NO. : 15/983692
DATED : May 12, 2020
INVENTOR(S) : Diana Maamari Page 1 of 1

It is certified that error appears in the above-identified patent and that said Letters Patent is hereby corrected as shown below:

In Column 44, Line 16, Claim 19, delete "second including" and insert --second transmission including--.

Signed and Sealed this
First Day of September, 2020

Andrei Iancu
*Director of the United States Patent and Trademark Office*